United States Patent
Hasegawa et al.

(10) Patent No.: US 9,397,378 B2
(45) Date of Patent: Jul. 19, 2016

(54) WAVEGUIDE-TYPE IMAGE REJECTION FILTER AND SINGLE-SIDEBAND RECEIVER, FREQUENCY DIVIDER, AND SIDEBAND-SEPARATING RECEIVER USING THE SAME FILTER

(71) Applicant: OSAKA PREFECTURE UNIVERSITY PUBLIC CORPORATION, Sakai-shi, Osaka (JP)

(72) Inventors: Yutaka Hasegawa, Sakai (JP); Hideo Ogawa, Sakai (JP); Shin'ichiro Asayama, Mitaka (JP)

(73) Assignee: OSAKA PREFECTURE UNIVERSITY PUBLIC CORPORATION, Sakai (JP)

( * ) Notice: Subject to any disclaimer, the term of this patent is extended or adjusted under 35 U.S.C. 154(b) by 0 days.

(21) Appl. No.: 14/768,618

(22) PCT Filed: Jan. 30, 2014

(86) PCT No.: PCT/JP2014/052100
§ 371 (c)(1),
(2) Date: Aug. 18, 2015

(87) PCT Pub. No.: WO2014/129283
PCT Pub. Date: Aug. 28, 2014

(65) Prior Publication Data
US 2016/0006098 A1  Jan. 7, 2016

(30) Foreign Application Priority Data

Feb. 19, 2013 (JP) .................................. 2013-030066

(51) Int. Cl.
*H04B 1/10* (2006.01)
*H01P 1/213* (2006.01)
(Continued)

(52) U.S. Cl.
CPC ................ *H01P 1/213* (2013.01); *H01P 1/208* (2013.01); *H01P 5/16* (2013.01); *H04B 1/16* (2013.01)

(58) Field of Classification Search
CPC .................................... H01P 1/213; H01P 5/16
USPC ............................ 455/67.15, 67.11, 286, 307
See application file for complete search history.

(56) References Cited

U.S. PATENT DOCUMENTS

| 3,056,096 A | 9/1962 | Vane |
| 4,661,997 A * | 4/1987 | Roberts ............... H03D 9/0641 455/327 |

(Continued)

FOREIGN PATENT DOCUMENTS

| FR | 2346868 | 10/1977 |
| JP | 2002-50909 | 2/2002 |

(Continued)

OTHER PUBLICATIONS

"A Wave Guide Band-Stop Filter as an Image Rejection Filter for Measurement of Stratoshperic Ozone", Shin'ichiro Asayama et al., International Journal of Infrared and Millimeter Waves, vol. 24, No. 11, Nov. 2003, pp. 1833-1839.

(Continued)

*Primary Examiner* — Sonny Trinh
(74) *Attorney, Agent, or Firm* — Nixon & Vanderhye, PC

(57) ABSTRACT

An image rejection filter comprising a waveguide-type 90-degree hybrid coupler having an input port for receiving an input signal within a millimeter or submillimeter band, first and second output ports for dividing the input signal in two and outputting the divided signals, respectively, wherein the one signal deviates by a 90-degree phase from the other signal, and a branch port for outputting the signal; a pair of band pass filters: a waveguide-type first band pass filter whose one end is connected with the first output port and a waveguide-type second band pass filter whose one end is connected with the second output port; and a pair of radiowave absorptive terminations: a first radiowave absorptive termination connected to the other end of the first band pass filter and a second radiowave absorptive termination connected to the other end of the second band pass filter.

11 Claims, 24 Drawing Sheets

(51) Int. Cl.
*H01P 1/208* (2006.01)
*H01P 5/16* (2006.01)
*H04B 1/16* (2006.01)

(56) References Cited

U.S. PATENT DOCUMENTS

| | | | | |
|---|---|---|---|---|
| 7,466,929 | B2 * | 12/2008 | Baney | H04B 10/60 250/214 R |
| 7,769,347 | B2 * | 8/2010 | Louberg | H04W 92/20 455/10 |
| 7,912,506 | B2 * | 3/2011 | Lovberg | H04W 92/20 455/445 |
| 2011/0080229 | A1 | 4/2011 | Kenington | |

FOREIGN PATENT DOCUMENTS

| | | |
|---|---|---|
| JP | 2004-343654 | 12/2004 |
| JP | WO2007/066426 | 6/2007 |
| JP | 2007-208350 | 8/2007 |
| JP | 2008-109500 | 5/2008 |

OTHER PUBLICATIONS

International Search Report for PCT/JP2014/052100, mailed Apr. 8, 2014, 4 pages.

* cited by examiner

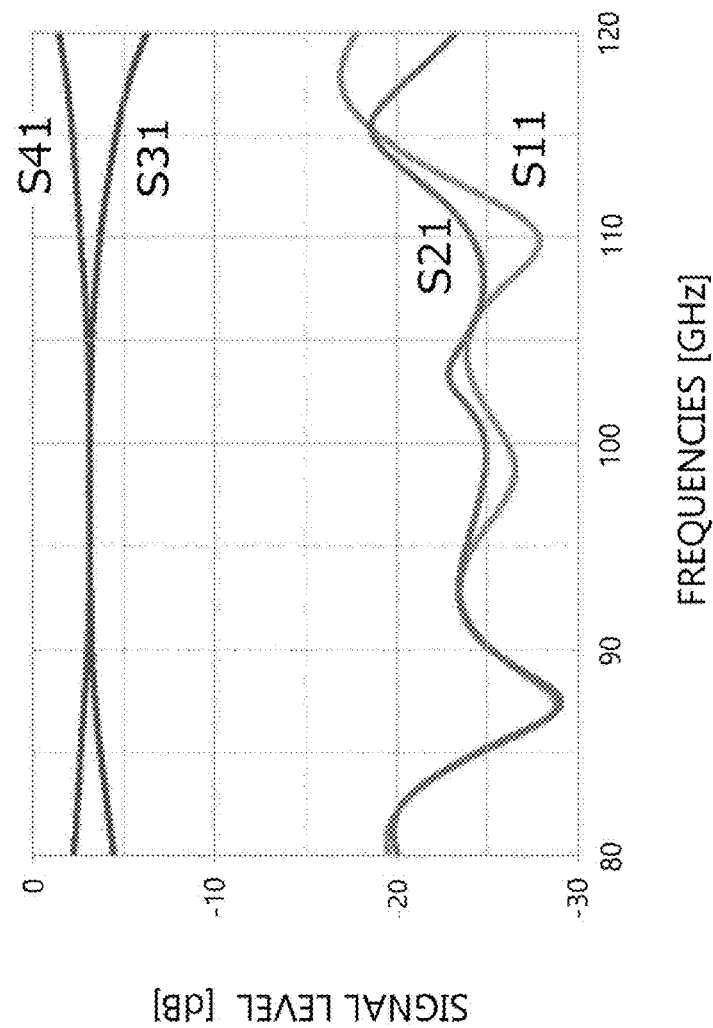
Fig.4

WAVEGUIDE-TYPE IMAGE REJECTION FILTER AND SINGLE-SIDEBAND RECEIVER, FREQUENCY DIVIDER, AND SIDEBAND-SEPARATING RECEIVER USING THE SAME FILTER

This application is the U.S. national phase of International Application No. PCT/JP2014/052100 filed 30 Jan. 2014, which designated the U.S. and claims priority to JP Patent Application No. 2013-030066 filed 19 Feb. 2013, the entire contents of each of which are hereby incorporated by reference.

TECHNICAL FIELD

This invention relates to a waveguide-type image rejection filter and a single-sideband receiver, a frequency divider, and a sideband-separating receiver using the same filter.

BACKGROUND ART

A heterodyne receiving system has been known, that receives spectra from astronomical objects and atmospheric minor molecules.

For example, it is on its way to becoming assured as a result of recent research efforts that rarefied interstellar materials including gases and dusts give a birth of a star; and the rarefied interstellar materials emit electromagnetic waves within a millimeter or submillimeter band of oscillation frequencies fixed by every molecular species associated with rotating motions of molecules of the interstellar materials. These electromagnetic waves are observed so as to achieve research outcomes with respect to birth and evolution of stars. Known as equipment for observing the electromagnetic waves are radio telescopes.

To observe, for example, ozone spectral emission by using a superconductor insulator superconductor (SIS), a system for measuring ozone in the atmosphere has been known.

The electromagnetic waves of the astronomical objects and the atmospheric molecules are extremely imperceptible and need to be amplified. It, however, is not easy to amplify the electromagnetic waves because noise from a receiver reaches a considerable level for signal processing. In addition, amplification equipment is rarely available, that may directly amplify the waves at frequency bands called millimeter and submillimeter bands. Accordingly, a local oscillator signal (or an LO signal) that is slightly different in frequency from an electromagnetic wave signal (a radio-frequency signal or an RF signal) is generated; and the electromagnetic wave signal and the local oscillator signal are mixed together to obtain a difference of these frequencies. This enables the signal within a high-frequency band to be converted to an easily-processable intermediate-frequency signal (IF signal) within a low-frequency band. This is what has been referred to as the heterodyne receiving system described above, and a frequency converter used for this system is referred to as a mixer.

The heterodyne receiving system using the mixer outputs two frequency bands—high-frequency waves and low-frequency waves—where a frequency of the LO signal ($f_{LO}$) is configured to be a center of the IF signals. This IF band is referred to as a sideband; and in particular a sideband on the side of the high-frequency waves is referred to as an upper sideband (USB) while a sideband on the side of the low-frequency waves is referred to as a lower sideband (LSB) (see FIG. 16). Two IF bands are obtained as exactly same frequency from the mixer. This is referred to as a double sideband (DSB) mode. To observe the waves independently, the IF bands are separated into USB and LSB. This is referred to as a single-sideband (SSB) mode.

The observation is carried out by using one of a USB signal and an LSB signal—for example, only the USB signal is used. In this case, the LSB band is eliminated by using a filter. The signal passed through the filter is amplified and is observed. The band that should be observed (e.g., USB) is referred to as a signal band, and the band that should be eliminated (e.g., LSB) is referred to as an image band.

To observe the spectra from the astronomical objects and the atmospheric molecules efficiently, it is necessary to sufficiently eliminate noise and interference of the image band from the signal that should be observed. Since spectral intensity of the astronomical objects changes according to a sideband ratio (a sensitivity ratio between the signal band and the image band) of the receiver, the single-sideband receiver is greatly significant for an accurate measurement of the spectra. Generally known as the single-sideband receiver is a quasi-optical receiver using an interferometric Martin-Puplett-type frequency filter with use of optical elements.

Also known as the single-sideband receiver is a receiver using a band rejection filter to eliminate an image band from a heterodyne receiver (see, for example, Patent Document 1 and Non-Patent Document 1). Such a band rejection filter for eliminating the image band is also referred to as an image rejection filter. Patent Document 1 discloses a system (a 2-backshort) for separating a double sideband by balanced two superconductor mixers.

The image rejection filter is one of the essential components to eliminate the unnecessary signals or to suppress the electromagnetic interference. Several image rejection filters have been developed, that use a waveguide. The waveguide is one of transmission lines used in the millimeter and the submillimeter bands.

FIG. 17 illustrates explanatory drawings indicating an example of a structure of a traditional waveguide-type image rejection filter disclosed in Non-Patent Document 1. FIG. 17 (a) illustrates a perspective view of a main part, and FIG. 17 (b) indicates an example of measurements of the main part. The measurements are indicated in units of millimeters (mm). As illustrated in FIG. 17, the traditional waveguide-type image rejection filter 100 comprises a main track 101 whose wide-width surface has resonators 103 placed thereon at intervals of about three-fourths intertubular wavelength, the resonators functioning as waveguides having a length of a one-half intertubular wavelength. The main track 101 is connected to each resonator 103 through an iris 105. The main track 101 is 2.54 mm in width and the iris 105 is 1.10 mm in opening width, in a direction toward the back of the main track illustrated in FIG. 17 (b).

FIG. 18 indicates a figuration of one of two waveguide blocks constituting the image rejection filter of FIG. 17. In this drawing, reference numerals 101, 103 and 105 point components comparable to the main track 101, the resonator 103 and the iris 105 of FIG. 17 (b), respectively.

FIG. 19 is a block diagram indicating a configuration example of an ozone measurement system using the image rejection filter of FIG. 17 (see Non-Patent Document 1). This ozone measurement system increases an image signal elimination ratio by placing the image rejection filter of FIG. 17 between a feedhorn and an SIS mixer.

PRIOR ART DOCUMENTS

Patent Document

Patent Document 1: Japanese Unexamined Patent Application Publication No. 2004-343654

Non-Patent Document

Non-Patent Document 1: Asamaya, Shin'ichiro, Hideo Ogawa, Yoshinori Yonekura, Kazuji Suzuki, Akira Mizuno, Hiroyuki Iwashita, and Takashi Noguchi. "Waveguide Band-Stop Filter as an Image Rejection Filter for Measurement of Stratospheric Ozone." *International Journal of Infrared and Millimeter Waves*. vol. 24. Issue 11. November 2003: 1833-1839.

SUMMARY OF THE INVENTION

Problems That the Invention is to Solve

The waveguide block illustrated in FIG. 17 having an integral structure requires cutting accuracy on the order of microns to be applicable to the millimeter and the submillimeter bands. It is not, however, easy to meet this cutting accuracy requirement. More specifically, meeting the cutting accuracy requirement takes trouble such as extra cutting or assembling. It has been, therefore, desired that the waveguide-type image rejection filter is suitable to mass production.

The traditional waveguide-type image rejection filter illustrated in FIG. 17 reflects radiowaves within a rejection band, and this results in standing waves caused by reflected waves and interference in the system. During a millimeter or submillimeter remote sensing in particular, the standing waves in the system deteriorate obtained data; therefore, unnecessary frequency components need to be terminated at a radiowave absorber, resulting in a more complicated structure of the image rejection filter.

This invention is contrived in view of the above-described circumstances and is to provide a waveguide-type image rejection filter that is suitable to mass production and suppresses characteristic degradation caused by reflected waves within a rejection band. This invention is also to provide a single-sideband receiver using the above-described image rejection filter, a frequency divider, and a sideband-separating receiver.

Means of Solving the Problems (1) This invention provides an image rejection filter comprising a waveguide-type 90-degree hybrid coupler having an input port for receiving an input signal within a millimeter or submillimeter band, first and second output ports for dividing the input signal in two and outputting the divided signals, respectively, wherein the one signal deviates by a 90-degree phase from the other signal, and a branch port for outputting the signal; a pair of band pass filters: a waveguide-type first band pass filter whose one end is connected with the first output port and a waveguide-type second band pass filter whose one end is connected with the second output port; and a pair of radiowave absorptive terminations: a first radiowave absorptive termination connected to the other end of the first band pass filter and a second radiowave absorptive termination connected to the other end of the second band pass filter.

(2) This invention provides a single-sideband receiver comprising the image rejection filter; a local oscillator for outputting a local oscillator signal for heterodyne reception; a coupler having two input ports and an output port, wherein the one input port is connected to the image rejection filter and the other input port is connected to the local oscillator, wherein the coupler couples the input signal having passed through the image rejection filter with the local oscillator signal and outputs the signals from the output port; and a mixer connected to the output port, wherein the mixer mixes the input signal having passed through the image rejection filter with the local oscillator signal and outputs an intermediate-frequency signal, and wherein the image rejection filter is configured to have a heterodyne receiving scheme to intercept either one of a USB band and an LSB band involved in the heterodyne reception.

(3) This invention provides a waveguide-type frequency divider comprising a waveguide-type front hybrid coupler having a front input port for receiving an input signal, front first and front second output ports for outputting divided input signals, respectively, wherein the one signal deviates by a 90-degree phase from the other signal, and a front branch port for outputting the signal; a pair of band pass filters: a waveguide-type first band pass filter whose one end is connected with the front first output port and a waveguide-type second band pass filter whose one end is connected with the front second output port; a waveguide-type rear hybrid coupler having a rear input port, rear first and rear second output ports, and a rear branch port, wherein the rear input port is connected to the other end of the first band pass filter and the rear branch port is connected to the other end of the second band pass filter; and a radiowave absorptive termination connected to the rear first output port.

(4) This invention provides a sideband-separating receiver using two frequency dividers described above to be used for USB and LSB, respectively, wherein a front branch port of the front frequency divider is connected to a front input port of the rear frequency divider, the sideband-separating receiver comprising the two frequency dividers: the front frequency divider allowing USB to pass through a pair of band pass filters and the rear frequency divider allowing LSB to pass through a pair of band pass filters; a local oscillator for outputting a local oscillator signal for heterodyne reception; a USB mixer whose one input is connected to a rear second output port of the USB frequency divider; a USB image rejection filter whose one end is connected to the other input of the USB mixer and configured for a backshort to intercept a USB band; a USB coupler placed on the other side of the USB image rejection filter to send the local oscillator signal to the USB mixer; an LSB mixer whose one input is connected to a rear second output port of the LSB frequency divider; an LSB image rejection filter whose one end is connected to the other input of the LSB mixer and configured for a backshort to intercept an LSB band; and an LSB coupler placed on the other side of the LSB image rejection filter to send the local oscillator signal to the LSB mixer.

Effects of the Invention

The image rejection filter (1) of this invention comprises the 90-degree hybrid coupler, a pair of the band pass filters, and a pair of the radiowave absorptive terminations; thus this filter is easily processed and is suitable to mass production. In addition, since a pair of the radiowave absorptive terminations of the image rejection filter absorbs reflected waves within a frequency band that should be intercepted, the image rejection filter may suppress characteristic degradation caused by reflection of an unwanted band.

The single-sideband receiver (2) comprises the image rejection filter, the coupler for coupling the input signal having passed through the image rejection filter with the local oscillator signal, and the mixer; thus this receiver is easily processed and may obtain a large sideband ratio (image rejection ratio) by suppressing reflection. In addition, since this receiver uses a passive waveguide circuit; thus the receiver may minimize secular changes and may steadily retain the sideband ratio even after long-term use.

The frequency divider (3) comprises the front and the rear hybrid couplers, a pair of the band pass filters, and the radiowave absorptive termination; thus this divider is easily processed and may be configured as a passive waveguide circuit, with the result that the divider may steadily retain its characteristics for long periods of time.

The sideband-separating receiver (4) comprises the USB and the LSB frequency dividers, a pair of the mixers, a pair of the image rejection filters, and a pair of the couplers; thus this receiver is easily processed and may substantiate a large sideband ratio by suppressing reflection.

This invention will be detailed further.

In this invention, the 90-degree hybrid couplers; the band pass filters; and the radiowave absorptive terminations may be substantiated by the waveguide circuits. The waveguide circuits are passive circuits and may bring the advantages such as minimizing the secular changes and providing the steady characteristics. Moreover, these waveguide circuits may substantialize their structures relatively simple compared to other waveguide circuits; thus these circuits are easily cut and are suitable to mass production. The same applies to the couplers and the mixers.

BRIEF DESCRIPTION OF THE DRAWINGS

FIG. 4 is a graph indicating frequency characteristics of a 90-degree hybrid coupler in the image rejection filter of FIG. 3.

DESCRIPTION OF EMBODIMENTS

Figure 1:
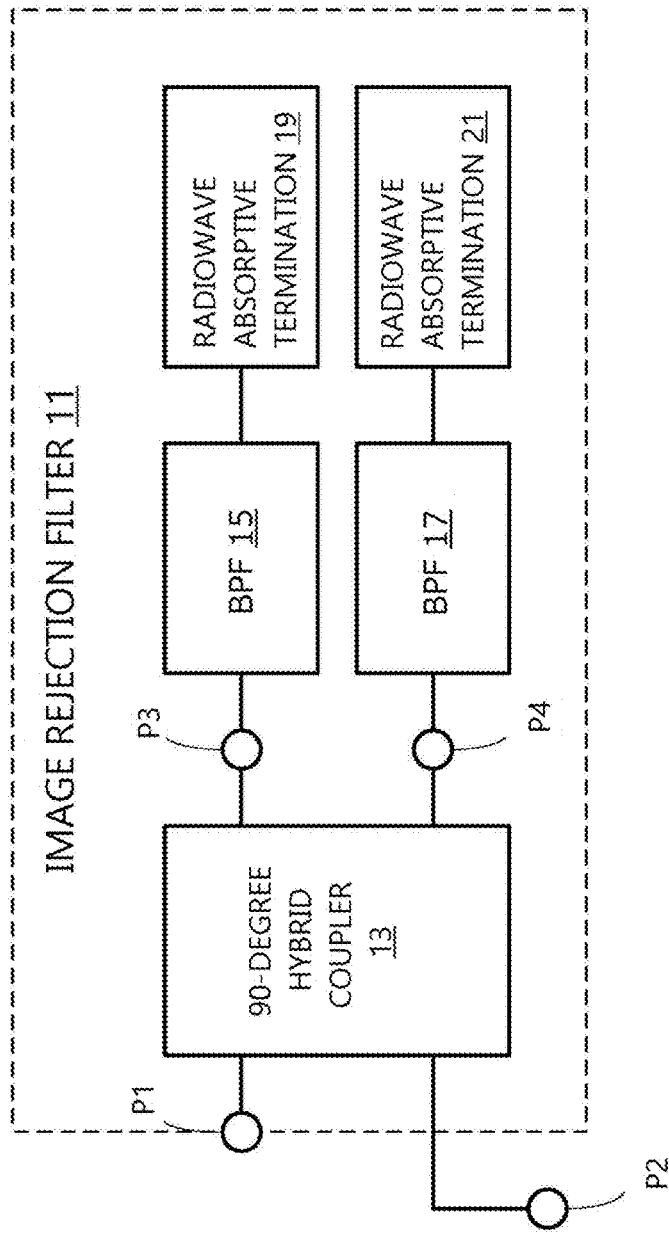
FIG. 1 is a block diagram indicating structural components of an image rejection filter of this invention and how the components are connected.

In the following, preferred aspects of this invention will be explained.

The 90-degree hybrid coupler and a pair of the band pass filters may be configured as an integrated waveguide unit; and a pair of the radiowave absorptive terminations may be connected to the waveguide units, respectively.

The 90-degree hybrid coupler comprises a first waveguide; a second waveguide; and a coupling section for coupling the first waveguide to the second waveguide, wherein the first waveguide has the input port at its end and the first band pass filter at the other end, and the second waveguide has the branch port at its end and the second band pass filter at the other end, wherein a shortest waveguide length between the coupling section and the first band pass filter along the first waveguide is the same as a shortest waveguide length between the coupling section and the second band pass filter along the second waveguide, and wherein the waveguide length may meet the following formula:

$$\frac{\lambda_g}{4} < d < 5 \cdot \lambda_g \qquad \text{[Formula 1]}$$

wherein d indicates a waveguide length, and $\lambda_g$ indicates a wavelength of an image band that should be intercepted in the waveguide.

The "shortest" waveguide length between the coupling section and the first band pass filter indicates a waveguide length from an edge of the coupling section close to the first band pass filter to an edge of the first band pass filter close to the coupling section. The same applies to the "shortest" waveguide length between the coupling section and the second band pass filter, and this "shortest" waveguide length indicates a waveguide length from an edge of the coupling section close to the second band pass filter to an edge of the second band pass filter close to the coupling section.

The waveguide length may also meet the following formula:

$$\frac{\lambda_g}{2} < d < \lambda_g \quad \text{[Formula 2]}$$

wherein d indicates the waveguide length, and $\lambda_g$ indicates a wavelength of an image band that should be intercepted in the waveguide.

In addition, the first waveguide from the coupling section to the first band pass filter may be configured to be a straight line; and the second waveguide from the coupling section to the second band pass filter may be configured to be a straight line.

The frequency divider (3) may be configured as a multi-output frequency divider as a preferred aspect such that a plurality of the frequency dividers of this invention may be lined up and connected in series, wherein a front branch port of the front frequency divider is connected to a front input port of the rear frequency divider and wherein the band pass filter pair of the one frequency divider is different in pass band from the band pass filter pair of the other frequency divider.

The front and the rear hybrid couplers and a pair of the band pass filters may be configured as an integrated waveguide unit.

The front hybrid coupler comprises a first waveguide; a second waveguide; and a coupling section for coupling the first waveguide to the second waveguide, wherein the first waveguide has the input port at its end and the first band pass filter at the other end, and the second waveguide has the branch port at its end and the second band pass filter at the other end, wherein a shortest waveguide length between the coupling section and the first band pass filter along the first waveguide is the same as a shortest waveguide length between the coupling section and the second band pass filter along the second waveguide, and wherein the waveguide length may meet the following formula:

$$\frac{\lambda_g}{4} < d < 5 \cdot \lambda_g \quad \text{[Formula 3]}$$

wherein d indicates a waveguide length, and $\lambda_g$ indicates a wavelength of an image band that should be intercepted in the waveguide.

The waveguide length may also meet the following formula:

$$\frac{\lambda_g}{2} < d < \lambda_g \quad \text{[Formula 4]}$$

wherein d indicates the waveguide length, and $\lambda_g$ indicates a wavelength of an image band that should be intercepted in the waveguide.

In addition, the first waveguide from the coupling section to the first band pass filter may be configured to be a straight line; and the second waveguide from the coupling section to the second band pass filter may be configured to be a straight line.

This preferred aspect also includes combinations of preferred aspects.

In the following, this invention will be explained in detail through the use of the drawings. Note that the following explanations are exemplifications in all respects and should not be comprehended to limit this invention only to these explanations.

(Embodiment 1)

The inventors of the present invention arrived at an idea of the structures of this invention different from traditional image rejection filters that reflect electromagnetic waves within a rejection band by using a resonator. Namely, the image rejection filter of this invention is capable of suppressing reflections by guiding only electromagnetic waves within a band that should be intercepted to a radiowave absorber.

<<Structural Components of Image Rejection Filter and How the Components are Connected>>

FIG. 1 is a block diagram indicating structural components of an image rejection filter of this invention and how the components are connected. As seen in FIG. 1, an image rejection filter 11 comprises the following three main components:

i) a waveguide-type 90-degree hybrid coupler (indicated by a reference numeral 13 in FIG. 1)
ii) waveguide-type band pass filters (indicated as BPF 15 and BPF 17, respectively, in FIG. 1)
iii) radiowave absorptive terminations (indicated as radiowave absorbers 19 and 21, respectively, in FIG. 1)

The image rejection filter of the present invention has another characteristic aspect such that the components i to iii are combined in various ways in a waveguide circuit with a millimeter or submillimeter band.

In FIG. 1, the 90-degree hybrid coupler 13, which is one of the structural components of the image rejection filter 11, is provided with an input port P1; a branch port P2; and output ports P3, P4. Each of the output ports P3, P4 outputs an RF signal that has half intensity (electric power) of an RF signal inputted into the input port P1. The RF signal outputted from the output port P4 deviates by a 90-degree phase from the RF signal outputted from the output port P3. A simple exemplification to explain this in an easy-to-understand manner is that the output port P4 outputs the RF signal having a phase with a one-fourth wavelength of the input port P1—in other words, the RF signal is outputted 90 degrees later. In this simple exemplification, the output port P3 outputs the RF signal 90 degrees earlier than the output port P4—in other words, the output port P3 outputs the RF signal having the same phase as the RF signal inputted into the input port P1. This type of orthogonal hybrid coupler has been well known in the relevant art. Generally, 90-degree hybrid couplers are used to divide one high-frequency signal in two or to couple two high-frequency signals together. To divide the signal, the branch port P2 is terminated so that reflections do not occur. Once the RF signal is inputted into the input port P1, the divided signals are outputted to the output port P3 and the output port P4, respectively. To couple the signals, on the other hand, the signal is inputted from the output port P3 and the output port P4 each; and the coupled signal is outputted to the input port P1 and the branch port P2.

As seen in FIG. 1, the output port P3 of this invention is connected with an end of the BPF 15; and the BPF 15 is terminated at the radiowave absorber 19 at its other end. The output port P4 is connected with an end of the BPF 17, and the BPF 17 is terminated at the radiowave absorber 21 at its other end. The output port P3 has a circuit similar to that of the output port P4. Namely, the BPF 15 and the BPF 17 have the same pass-band characteristics.

The following explain characteristics of the image rejection filter 11 briefly.

In the case where an RF signal having a frequency "within" pass bands of the BPF 15 and the BPF 17 enters the input port P1, the signal is divided by the 90-degree hybrid coupler in two; and then the divided signals pass through the BPF 15 and the BPF 17, respectively, and end up in the radiowave absorber 19 and the radiowave absorber 21, respectively. In the case where an RF signal having a frequency "outside" the pass bands of the BPF 15 and the BPF 17 enters the input port P1, the signal is divided in two—the one signal deviates by a 90-degree phase from the other signal—and the divided signals are outputted from the output port P3 and the output port P4, respectively. In this simple example, the output port P3 outputs the RF signal having a 0-degree phase difference with the input RF signal; and the output port P4 outputs the RF signal having a -90-degree phase difference with the input RF signal.

The RF signals outputted from the output port P3 and the output port P4 are reflected by the BPF 15 and the BPF 17, respectively. All of these reflected waves go back to the 90-degree hybrid coupler 13. Each of the reflected waves has half intensity of the input RF signal as long as the 90-degree hybrid coupler 13, the BPF 15 and the BPF 17 do not have any loss.

The reflected wave returning to the 90-degree hybrid coupler 13 through the output port P3 is divided in two—the one wave deviates by a 90-degree phase from the other wave—and the divided waves are outputted from the input port P1 and the branch port P2, respectively. In this simple example, the input port P1 outputs the RF signal having a 0-degree phase difference with the return RF signal and the input RF signal; and the branch port P2 outputs the RF signal having a 0-degree phase difference with the return RF signal, that is, the RF signal having a -90-degree phase difference with the input RF signal.

The reflected wave returning to the 90-degree hybrid coupler 13 through the output port P4 is divided in two—the one wave deviates by a 90-degree phase from the other wave—and the divided waves are outputted from the branch port P2 and the input port P1, respectively. In this simple example, the branch port P2 outputs the RF signal having a -90-degree phase difference with the input RF signal; and the input port P1 outputs the RF signal having a -180-degree phase difference with the input RF signal.

Accordingly, the reflected waves returning to the 90-degree hybrid coupler 13 through the output port P3 and the output port P4 cancel each other out because these waves are the same in signal intensity and have a 180-degree phase difference at the input port P1, with the result that the return RF signal is not outputted from the input port P1. In the meanwhile, the reflected waves are the same in phase at the branch port P2, with the result that the RF signal is outputted from the branch port P2 because the RF signal is the same in signal intensity as the input and has a -90-degree phase difference with the input. Note that even if the 90-degree hybrid coupler is damaged, the reflected waves cancel each other out as long as the hybrid coupler is designed in such a way that the output port P3 and the output port P4 output the reflected waves having the same signal intensity.

Owing to the structure indicated in FIG. 1, the above-described features are summarized such that the signal within the pass band of the BPF 15 and the BPF 17 is terminated at the radiowave absorber 19 and the radiowave absorber 21; and a signal outside the pass band is outputted from the branch port P2. As a result, a non-reflective band rejection filter is obtained, that intercepts frequencies within the pass bands of the BPF 15 and the BPF 17. Once the pass bands of the BPF 15 and the BPF 17 coincide with image band, the pass bands function as image rejection filters.

Figure 2:
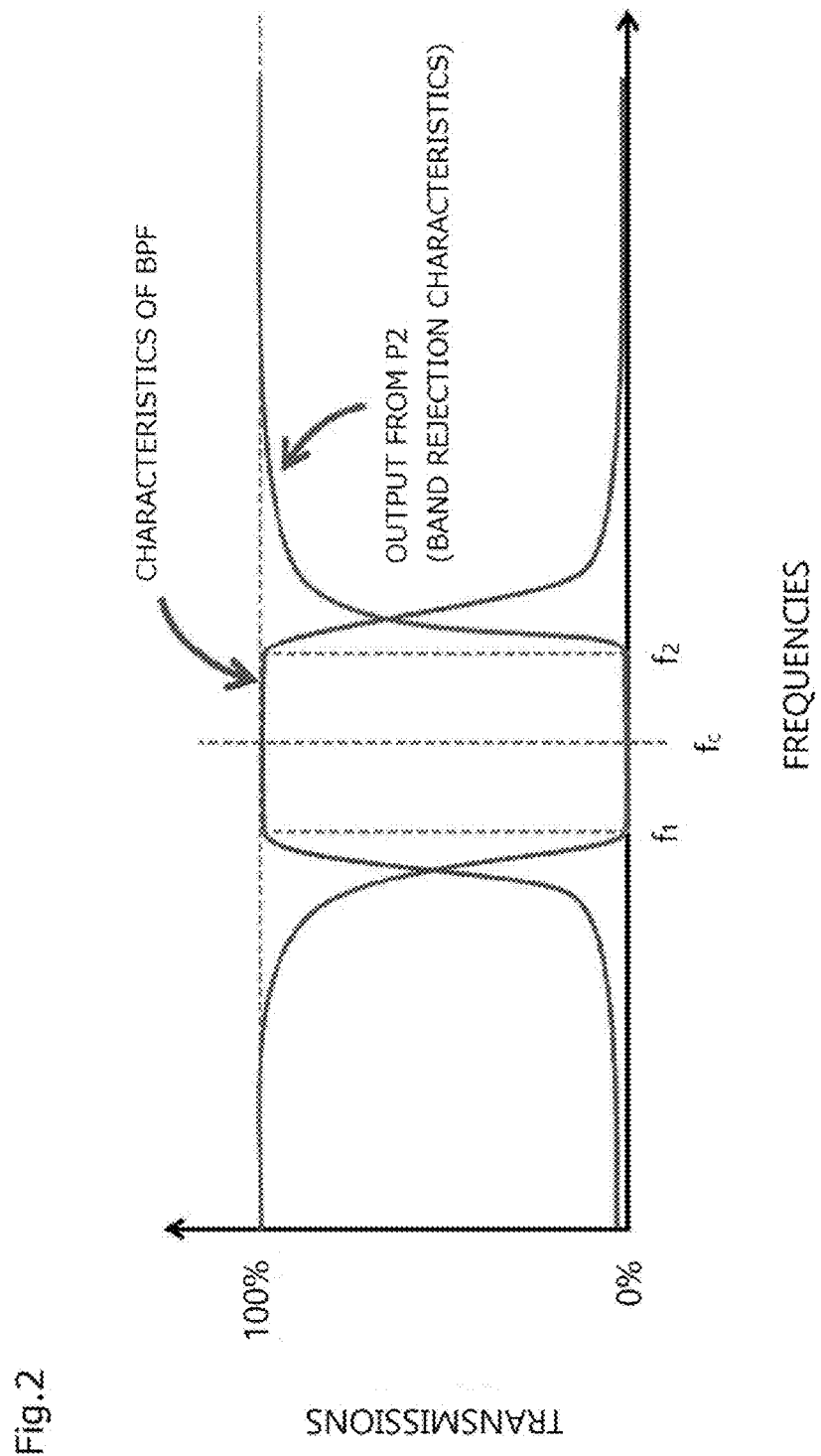
FIG. 2 is a graph schematically indicating frequency characteristics of the image rejection filter of this invention.

FIG. 2 is a graph schematically indicating frequency characteristics of the above-described image rejection filter 11. The horizontal axis indicates frequencies, and the vertical axis indicates transmissions. $f_c$ indicates a center frequency of the pass bands of the BPF 15 and the BPF 17, and a width from $f_1$ to $f_2$ indicates a bandwidth of the pass bands. In FIG. 2, the BPF 15 and the BPF 17 have the following frequency characteristics: A curve line is in a convex shape and goes through the bands between $f_1$ and $f_2$ with $f_c$ as the center of the bell curve. The RF signals having passed through the BPF 15 and the BPF 17 are absorbed by the radiowave absorber 19 and the radiowave absorber 21, respectively. The branch port P2, therefore, has output characteristics—i.e., the frequency characteristics as the image rejection filter 11—as follows: A curve line is concave with $f_c$ as a center of the concave line; and the signal between the band from $f_1$ to $f_2$ is intercepted while the signal outside the band passes through.

<<Detailed Structure of Image Rejection Filter>>

Figure 3:
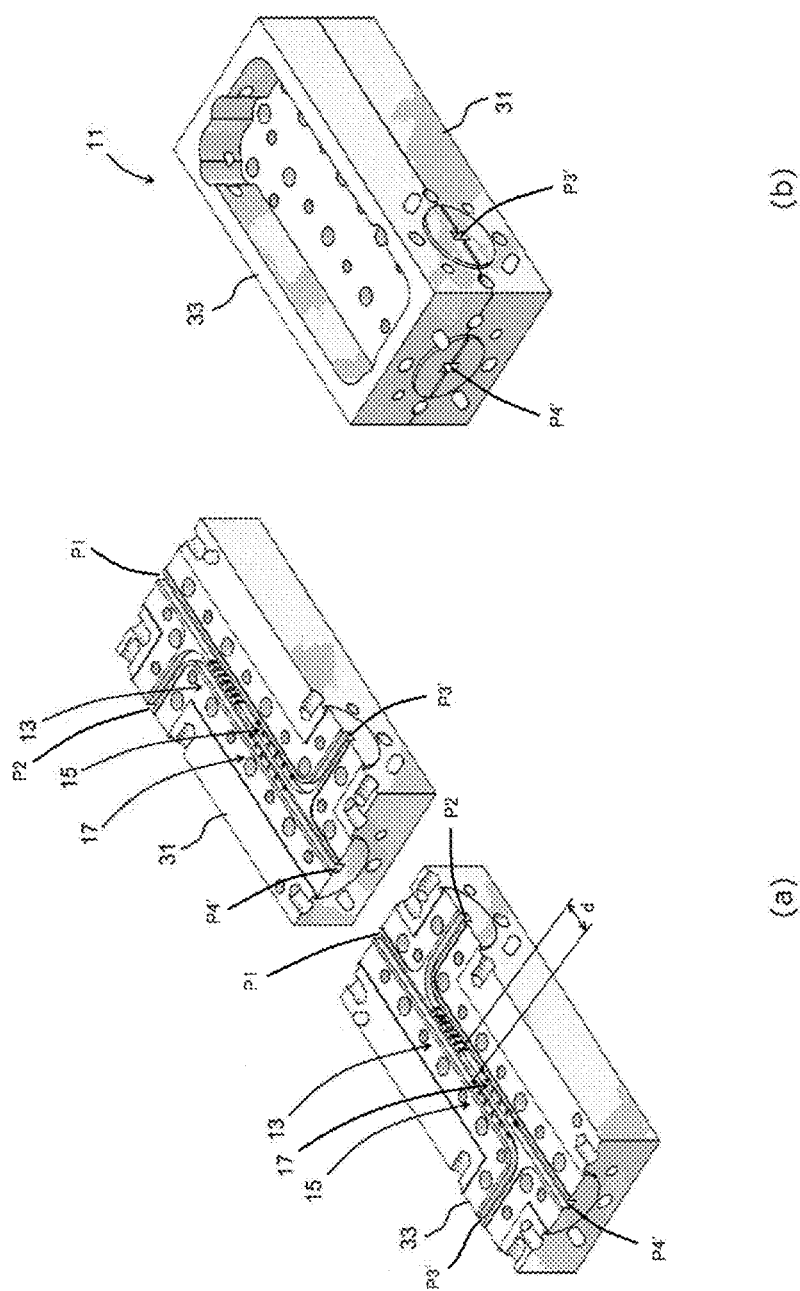
FIG. 3 illustrates external perspective views exemplifying detailed structures of the image rejection filter of this invention.

FIG. 3 illustrates external perspective views exemplifying a detailed structure of the image rejection filter 11 illustrated in FIG. 1. The image rejection filter 11 is formed of two blocks stacked on top of another: a waveguide block 31 and a waveguide block 33.

FIG. 3 (a) illustrates the waveguide blocks 31, 33 whose junction planes are turned upward so that waveguides are shown. Reference numerals 13, 15 and 17 in the drawings point positions functioning as the 90-degree hybrid coupler 13, the BPF 15 and the BPF 17 of FIG. 1, respectively, on the waveguides. In FIG. 3 (a), reference numerals P1 and P2 point positions comparable to the input port P1 and the branch port P2 of FIG. 1, respectively; while in FIG. 3 (a) and (b), reference numerals P3' and P4' point positions comparable to a port P3' and a port P4' placed at the other ends of the BPF 15 and the BPF 17, respectively, (which will be described below through the use of FIG. 6). A waveguide from the input port P1 to the port P3' via the BPF 15 is comparable to the first waveguide of this invention, and a waveguide from the branch port P2 to the port P4' via the BPF 17 is comparable to the second waveguide of this invention.

The 90-degree hybrid coupler 13 has guiding branches for guiding the signal through the first waveguide to the second waveguide. The signal inputted into the input port P1 is guided to the BPF 15 and the BPF 17 each in a 1:1 intensity ratio. The guiding branches are arranged along the first and the second waveguides in such a way as to have an interval of $\lambda_g/4$ between the neighboring branches. Owing to this structure, the signal guided to the BPF 17 in the second waveguide deviates by a 90-degree phase from the signal guided to the BPF 15 in the first waveguide. This is a reason why this type of the coupler is referred to as "90-degree hybrid coupler."

Figure 6:
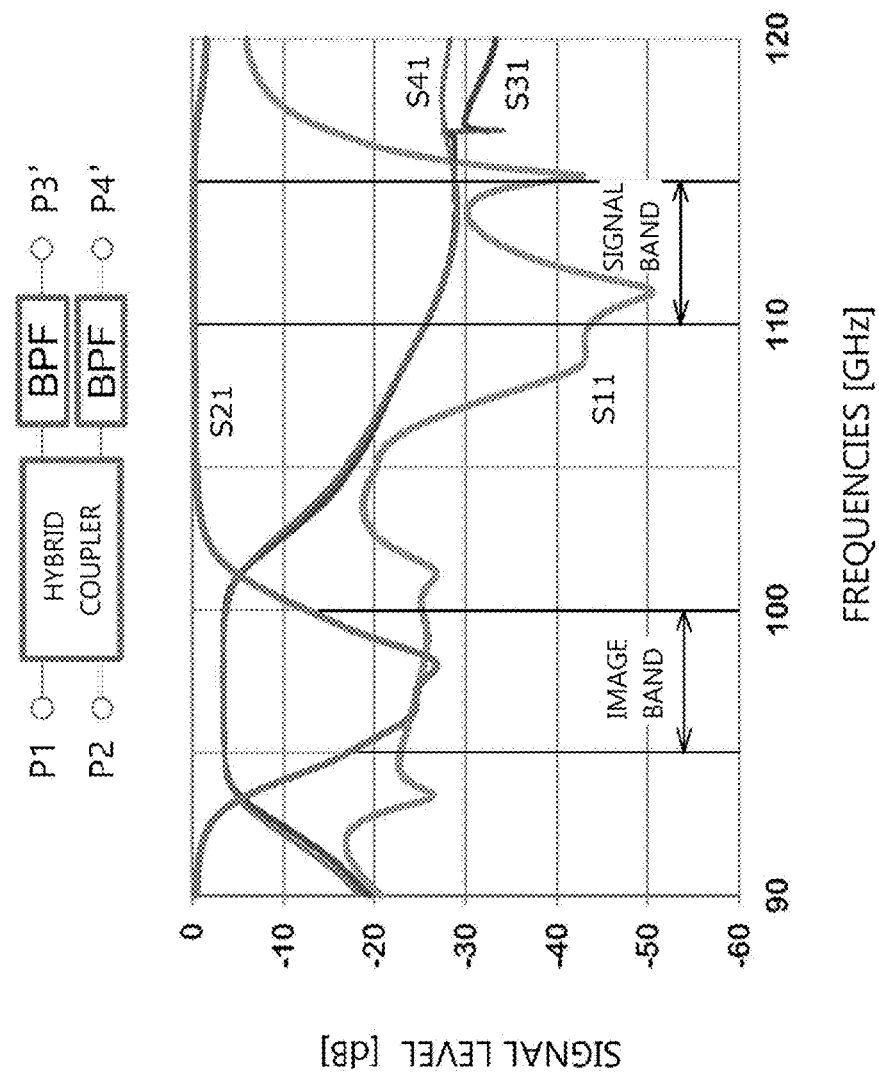
FIG. 6 is a graph indicating frequency characteristics of the image rejection filter of FIG. 3.
Figure 17:
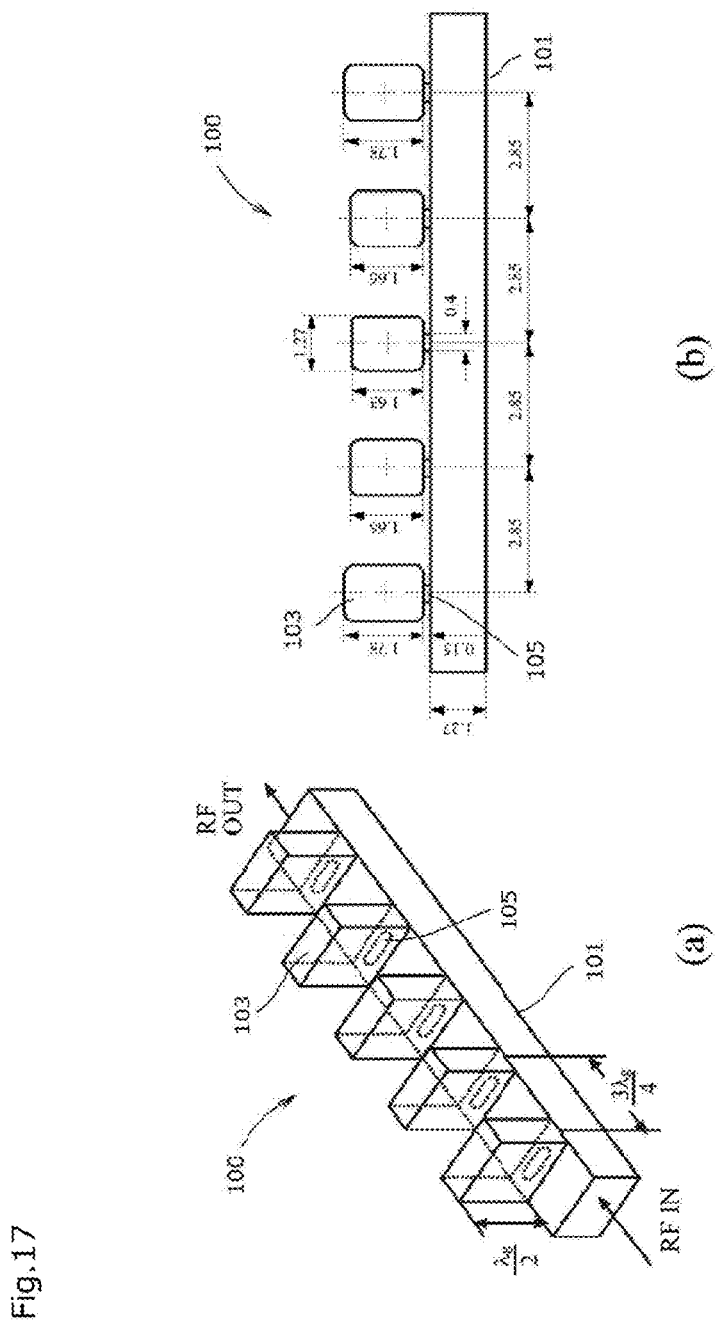
FIG. 17 illustrates explanatory drawings indicating an example of a structure of a traditional waveguide-type image rejection filter.
Figure 18:
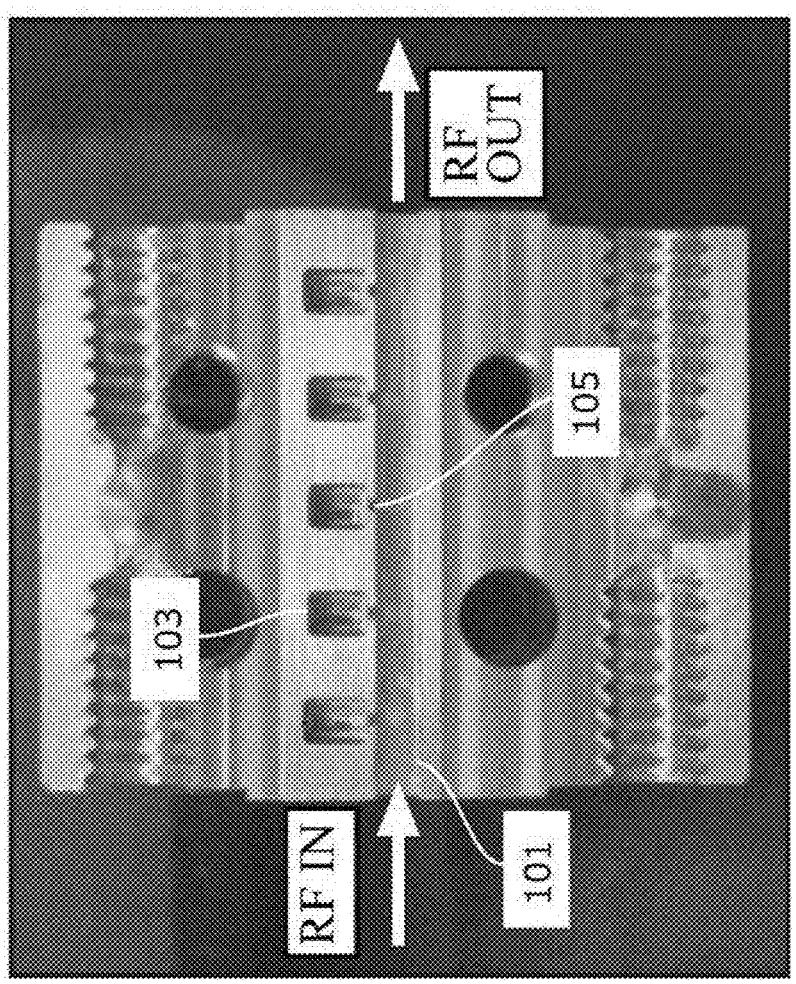
FIG. 18 indicates a figuration of one of two waveguide blocks constituting the image rejection filter of FIG. 17.
Figure 19:
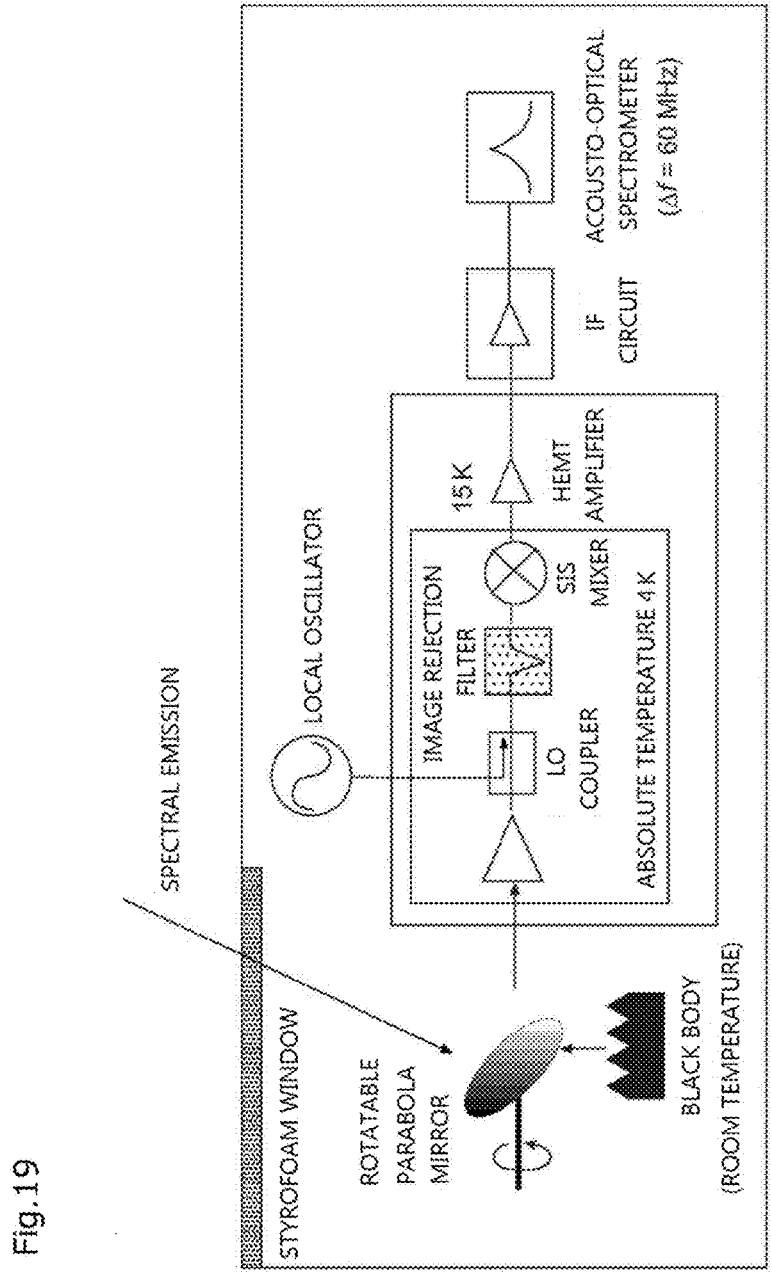
FIG. 19 is a block diagram indicating a configuration example of an ozone measurement system using the image rejection filter of FIG. 17.

A waveguide-type BPF may be substantialized by forming irises in its waveguide (see, for example, FIG. 6 of Japanese Unexamined Patent Application Publication No. 2003-163507). BPF may be prepared easier than the image rejection filter illustrated in FIG. 17 comprising the resonators in addition to the main track since the BPF is compact in size and has a simple structure.

The radiowave absorbers 19, 21 have waveguide-type terminations (not illustrated) connected to opening sections at tips of portions extended from the BPF 15 and the BPF 17, respectively, so that the waveguide-type terminations function as the radiowave absorbers 19, 21, respectively.

Used as the waveguide-type terminations may be terminations known in the relevant art. If the radiowave absorbers 19, 21 are separated from the image rejection filter 11 of FIG. 1, it makes it easier to use the waveguide circuits as a frequency divider or a sideband-separating receiver, as will be described in Embodiments 3 and 4.

FIG. 3 (b) illustrates the waveguide block 31 and the waveguide block 33 stacked on top of another. More specifically, FIG. 3 (b) illustrates the waveguide block 33 mounted on the waveguide block 31 after the waveguide block 33 is rotated 180 degrees. External dimensions of the waveguide block 31 and the waveguide block 33 stacked on top of another are, for example, 20 mm in height, 46 mm in length, and 22 mm in width. A cross-section surface of the waveguide is, for example, 2.54 mm in length and 1.27 mm in width.

The inventors made an extensive study in order to obtain an image rejection ratio of −20 dB or less. The inventors then found that it is highly desirable to form the 90-degree hybrid coupler 13, the BPF 15 and the BPF 17 in a single-piece structure and to set the 90-degree hybrid coupler 13 apart from the BPF 15 at a predetermined distance and set the 90-degree hybrid coupler 13 apart from the BPF 17 at a predetermined distance. In the following, a history of the study and findings thereby obtained will be described.

<<Study on Configuration of 90-degree Hybrid Coupler and BPFs>>

The inventors prepared a 90-degree hybrid coupler and BPFs individually, which constitute an image rejection filter, to evaluate their characteristics and then evaluated characteristics of the image rejection filter after the hybrid coupler was connected to the BPFs.

Figure 20:
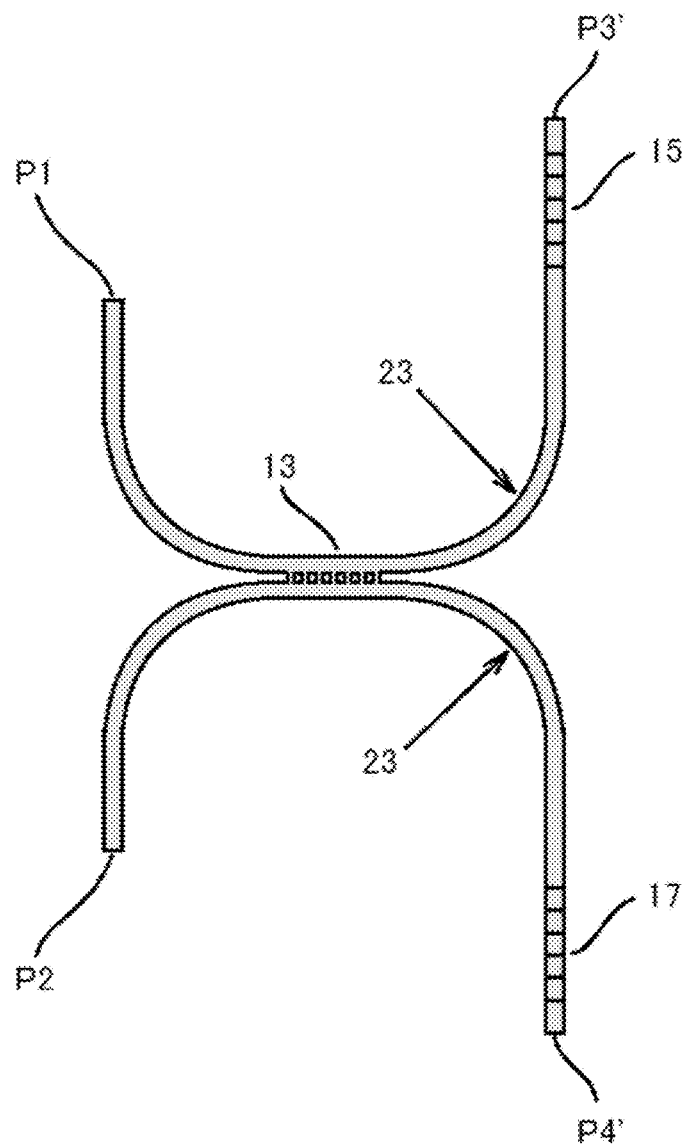
FIG. 20 illustrates an explanatory drawing indicating a structural example of a bent tube-type image rejection filter involved with this invention.

At first, the inventors made a try to connect the 90-degree hybrid coupler to the BPFs by using waveguides, respectively, (see FIG. 20) in consideration of the connection of a mixer and a wave input horn.

Figure 21:
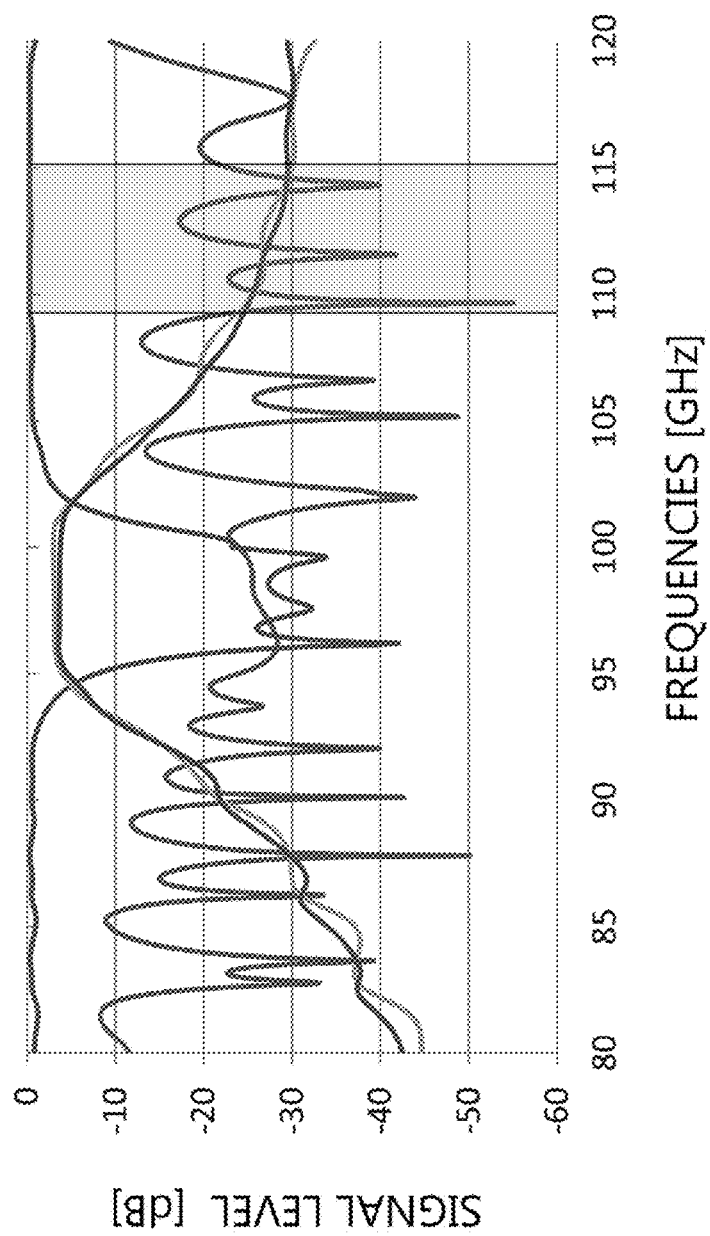
FIG. 21 is a graph indicating an example of frequency characteristics of the bent waveguide image rejection filter involved with this invention.

It was, however, unsuccessful to sufficiently suppress intensity of reflected waves in the image rejection filter in order to observe signal intensity within a band from 110 to 115 GHz comparable to a band to be observed or to a signal band, with the result that a ratio (image rejection ratio) of the reflected intensity to the signal intensity was over −20 dB (see FIG. 21). This makes it difficult to observe the signal within the band with high accuracy. The inventors then altered a radius of the bent tube and evaluated characteristics of the image rejection filter; however, it was unsuccessful to obtain an image rejection ratio of −20 dB or less.

The inventors then made a try to connect the 90-degree hybrid coupler directly with the BPFs without using the waveguide.

Figure 22:
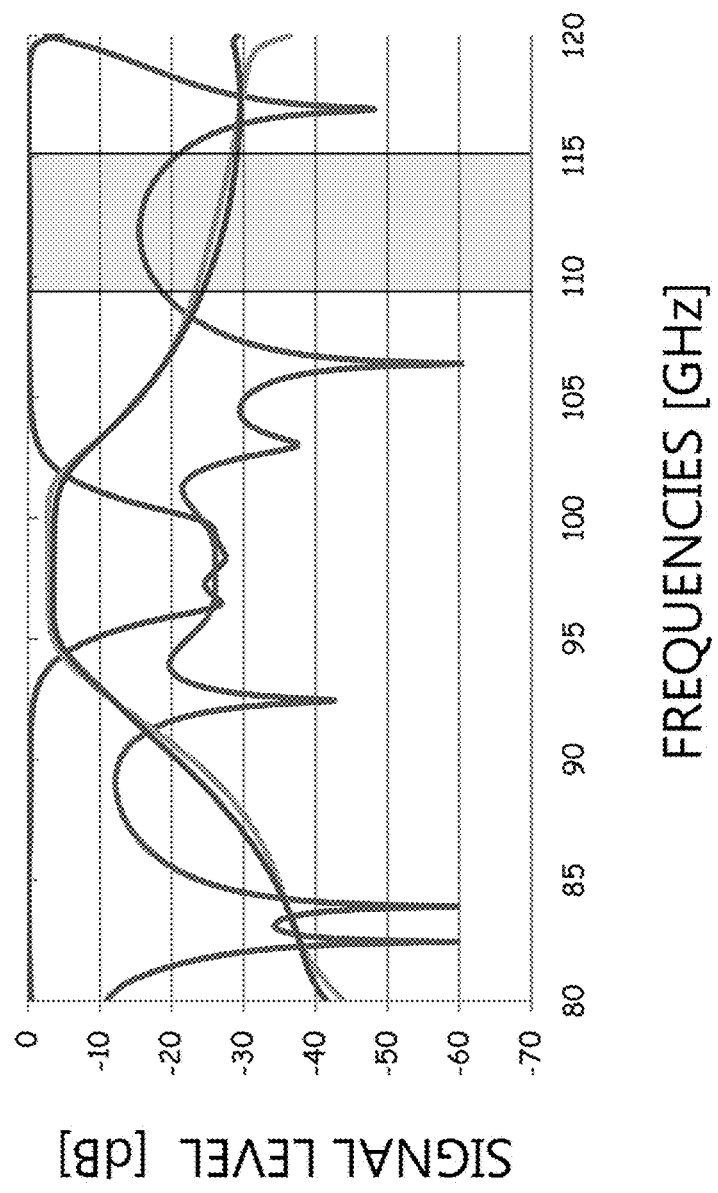
FIG. 22 is a graph indicating frequency characteristics of the image rejection filter involved with this invention in which a 90-degree hybrid coupler is connected directly with BPFs.

FIG. 22 is a graph indicating frequency characteristics of an image rejection filter in which the 90-degree hybrid coupler was connected directly with the BPFs. As seen in FIG. 22, it was also unsuccessful to obtain a sufficient image rejection ratio because intensity of the reflected waves within a band from 110 to 115 GHz comparable to a signal band was again over −20 dB. There was, however, a distinguishable result such that a surge of the reflected intensity relative to frequency changes was smaller than a surge indicated in FIG. 21.

This led the inventors to another inference such that the reflected intensity over −20 dB could be solved by a shortest distance d between the 90-degree hybrid coupler and the BPFs. More specifically, the inventors inferred that the longer distance d caused standing waves between the 90-degree hybrid coupler and the BPFs and that the reflections were affected by the standing waves. If this inference is correct, it should be confirmed by changing the distance d that a surge of the reflected intensity relative to a change in frequency has a change in periodicity.

Figure 23:
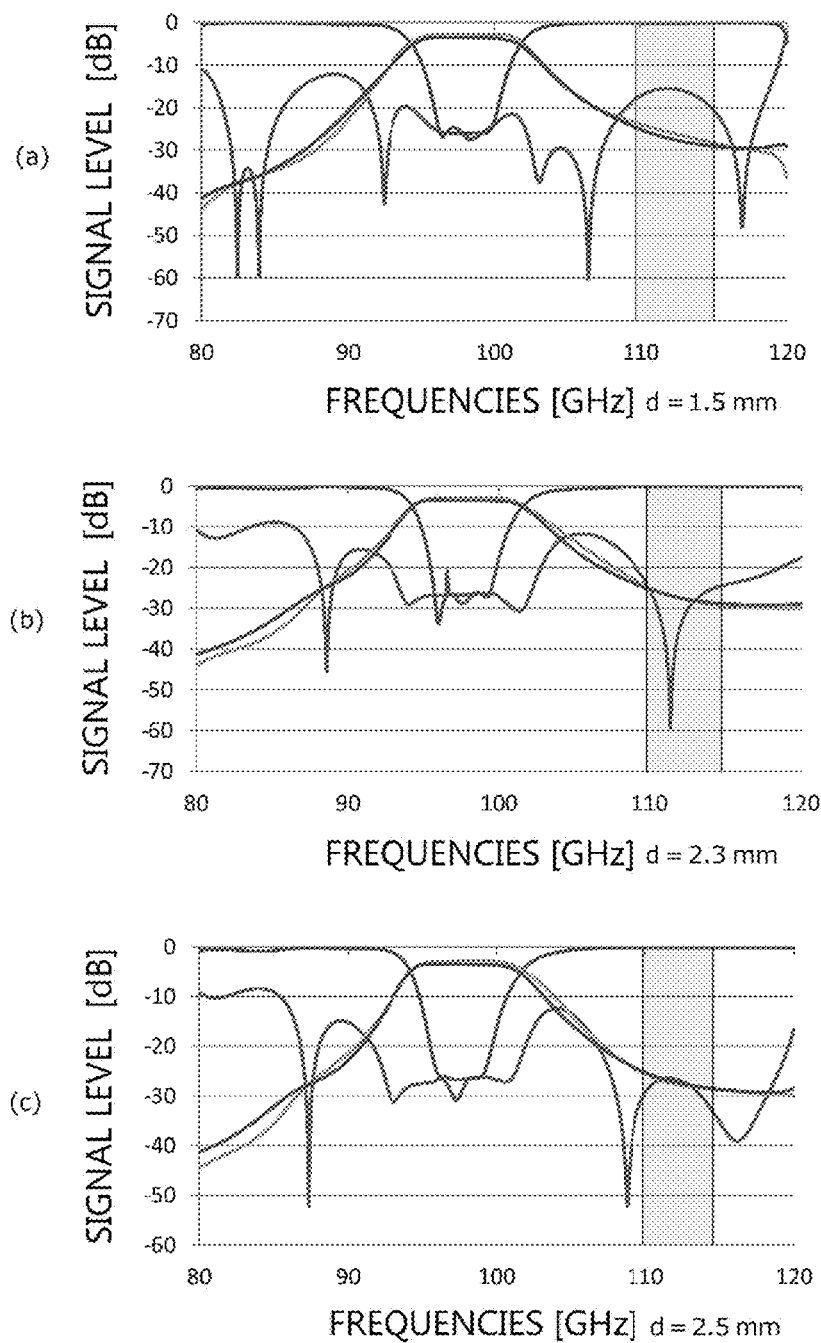
FIG. 23 provides graphs indicating frequency characteristics of the image rejection filter involved with this invention in which a distance d is changed (the distance is changed to 1.5 mm, 2.3 mm and 2.5 mm).
Figure 24:
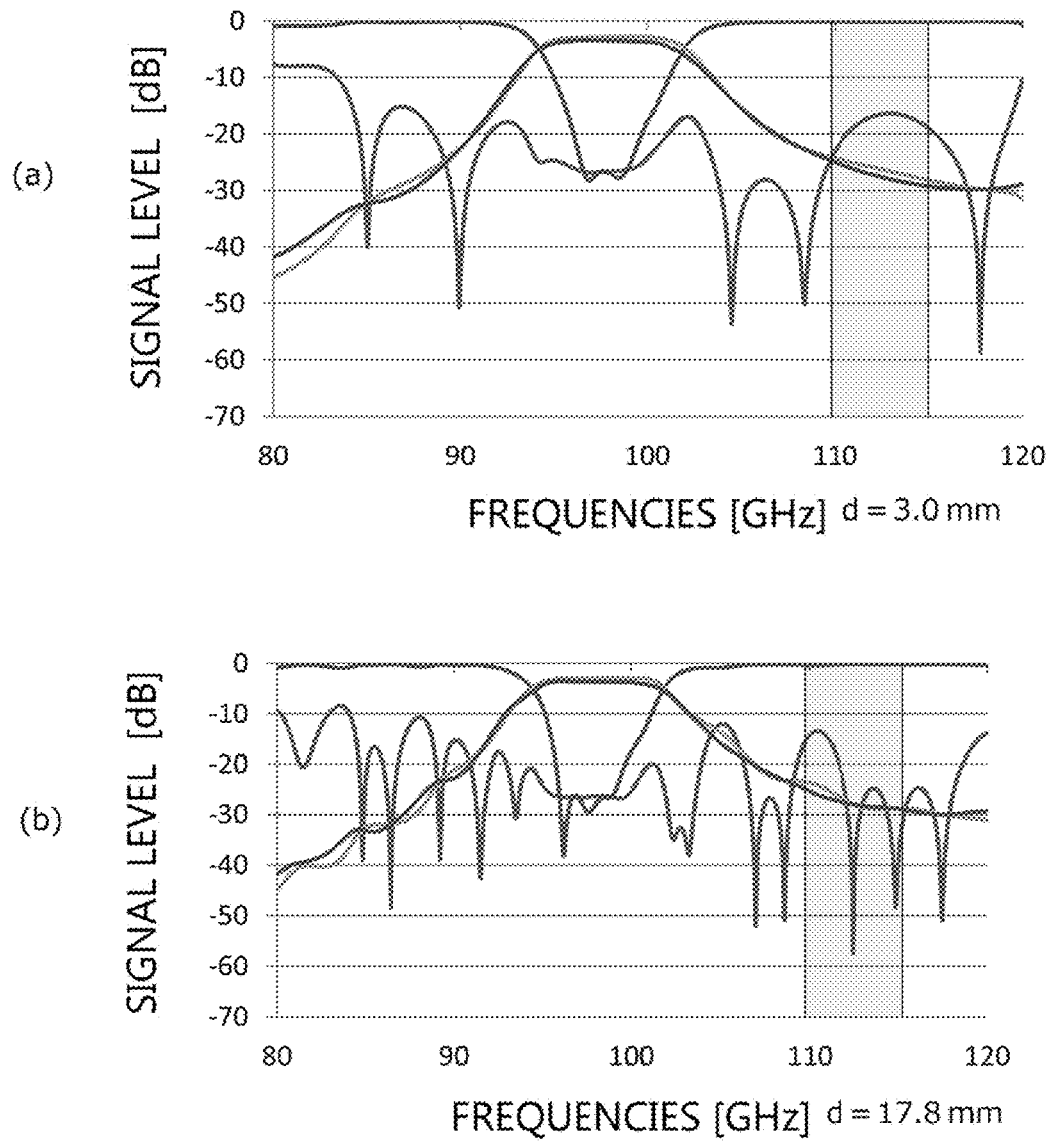
FIG. 24 provides graphs indicating frequency characteristics of the image rejection filter involved with this invention in which the distance d is change (the distance is changed to 3.0 mm and 17.8 mm).

Image rejection filters were then evaluated as a distance d was increased gradually. FIGS. 23 and 24 are graphs indicating frequency characteristics of the image rejection filters different in distance d. As seen in FIGS. 23 and 24, a surge of reflected intensity within a band from 110 to 115 GHz with d=1.5 mm and a surge of reflected intensity under the same condition except for d=3.0 mm are found to be similar to the surge of the reflected intensity within the band from 110 to 115 GHz comparable to the signal band with d=0 (direct connection). From this evaluation, the periodicity was confirmed with approximately d=1.5 mm. Moreover, a surge of reflected intensity with d=17.8 mm (see FIG. 24 (b)), which is longer than any others, was found to be similar to the surge of the reflected intensity in FIG. 21 indicating the frequency characteristics when using the bent tubes.

As described above, an overly long distance d causes many surges of the reflected intensity relative to a change in frequency; and the image rejection ratio becomes insufficient and unsteady. It is, therefore, significant to properly determine the distance d in consideration of the reflected intensity and the periodicity of the distance d.

In sum, the overly long distance between the 90-degree hybrid coupler 13 and the BPF 15 and between the 90-degree hybrid coupler 13 and the BPF 17 does not bring about a desired quality (the image rejection ratio of −20 dB or less). The 90-degree hybrid coupler 13 and the BPF 15 having a bend section 23 placed therebetween, or the 90-degree hybrid coupler 13 and the BPF 17 having a bend section 23 placed therebetween make the distance too long.

On the other hand, an overly short distance between the 90-degree hybrid coupler 13 and the BPF 15 and between the 90-degree hybrid coupler 13 and the BPF 17 does not also bring about the desired quality (the image rejection ratio of −20 dB or less).

The inventors then made an inference such that a waveguide where the 90-degree hybrid coupler 13 and the BPF 15 are placed, and a waveguide where the 90-degree hybrid coupler 13 and the BPF 17 are placed are configured to be a straight line so that a desirable image rejection ratio is obtained by changing the distance d.

The inventors made the various inferences as described above and arrived at the following.

The distance d between the 90-degree hybrid coupler 13 and the BPF 15 and between the 90-degree hybrid coupler 13 and the BPF 17 is desirable to range as follows:

$$\frac{\lambda_g}{4} < d < 5 \cdot \lambda_g \quad \text{[Formula 5]}$$

wherein d indicates a waveguide length, and $\lambda_g$ indicates a wavelength of an image band that should be intercepted in the waveguide. As an example, a signal within a band with 100 GHz in the waveguide comparable to the signal band of this Embodiment is about 3 mm in wavelength.

A lower limit of d may be determined, provided that any of the irises of the BPF 15 and of the BPF 17 are placed farther than the branch interval in the 90-degree hybrid coupler 13 or that the signals in the 90-degree hybrid coupler 13 are coupled without being disturbed.

It is more preferable that the distance d ranges as follows:

$$\frac{\lambda_g}{2} < d < \lambda_g \quad \text{[Formula 6]}$$

The suitable distance may be determined by calculating frequency characteristics of the image rejection filter with use of simulations, etc.

<<Image Rejection Filter and Frequency Characteristics of its Structural Components>>

Figure 5:
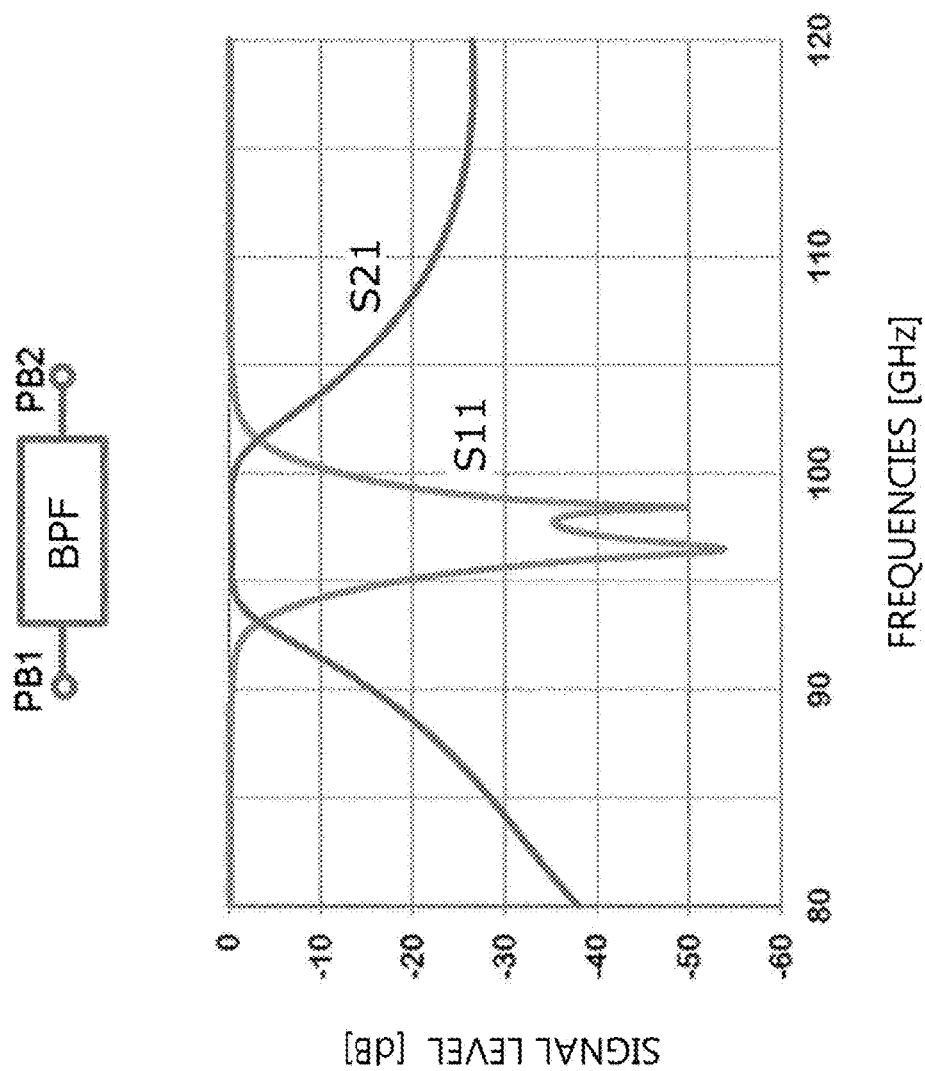
FIG. 5 is a graph indicating frequency characteristics of the BPF in the image rejection filter of FIG. 3.

FIG. 4 is a graph indicating frequency characteristics of only the 90-degree hybrid coupler 13 in the image rejection filter 11 of FIG. 3. FIG. 5 is a graph indicating frequency characteristics of only the BPF 15 and the BPF 17 in the image rejection filter 11 of FIG. 3. FIG. 6 is a graph indicating frequency characteristics of the image rejection filter 11 of FIG. 3. The graphs of FIGS. 4 to 6 are obtained from simulations.

The graph of FIG. 4 indicates four characteristic curves: S11, S21, S31 and S41. The characteristic curve S11 indicates a ratio of a signal inputted into the input port P1 to a signal returning to the input port P1 again after being reflected by any part of the 90-degree hybrid coupler 13. The characteristic curve S21 indicates a ratio of a signal inputted into the 90-degree hybrid coupler 13 from the input port P1 to a signal guided to the branch port P2 mainly through the branch section. The characteristic curve S31 indicates a ratio of a signal inputted into the input port P1 to a signal guided to the output port P3. The characteristic curve S41 indicates a ratio of a signal inputted into the input port P1 to a signal guided to the output port P4 after the 90-degree phase delay.

As described above, the signals outputted from and returning to the output ports P3, P4, respectively, after being reflected are outputted mostly from the branch port P2 as reflected signals.

The graph of FIG. 5 indicates two characteristic curves: S11 and S21. The characteristic curve S11 indicates a ratio of a signal inputted into a port PB1 placed at one end of the BPF 15 or the BPF 17 to a signal returning to the port PB1 again after being reflected by any part of the waveguide circuit functioning as the BPF. The characteristic curve S21 indicates a ratio of a signal inputted into the port PB1 at the one end of the BPF to a signal guided to a port PB2 placed at the other end of the BPF. Additionally, these characteristics may be exhibited upon using an in-line LC resonant circuit on the basis of an equivalent circuit.

The graph of FIG. 6 indicates four characteristic curves: S11, S21, S31 and S41. The characteristic curve S11 indicates a ratio of a signal inputted into the input port P1 of the 90-degree hybrid coupler, which constitutes the band filter 11, to a signal returning to the input port P1 again after being reflected by any part of the image rejection filter 11.

The characteristic curve S21 indicates a ratio of a signal inputted into the input port P1 to a signal guided to the branch port P2 after being reflected by any part of the BPF 15 and the BPF 17 in the image rejection filter 11.

The characteristic curve S31 indicates a ratio of a signal inputted into the input port P1 to a signal guided to the port PB2 (indicated as the port P3' in a block diagram of the band filter in FIG. 6) which is placed at the other end of the BPF 15, after passing through the BPF 15.

The characteristic curve S41 indicates a ratio of a signal inputted into the input port P1 to a signal guided to the port PB2 (indicated as the port P4' in the block diagram of the band filter in FIG. 6) which is placed at the other end of the BPF 17, after passing through the BPF 17 following the 90-degree phase delay.

In this Embodiment, a band from 95 to 100 GHz is referred to as an image band; and a band from 110 to 115 GHz is referred to as a signal band. As seen from the line of S21 in FIG. 6, the image rejection filter 11 has the following characteristics such as intercepting the image band at a ratio over 20 dB and allowing the signal band to pass with almost no loss. Namely, this filter substantializes the image rejection ratio of −20 dB or less. Most of the output signals from the output port P3' and the output port P4', which are indicated as the lines of S31 and S41, respectively, are terminated at the radiowave absorbers and do not become reflections.

Accordingly, the signals are rarely reflected by the output port P3' and the output port P4' and reach the branch port P2.

FIG. 6 indicates the result obtained from the simulations carried out by using high-precision and tried-and-true design tools; and an actually-prepared image rejection filter is also expected to have almost the same characteristics as the frequency characteristics indicated in FIG. 6 as long as the filter is precisely prepared.

The waveguide-type image rejection filter described above is capable of terminating an unnecessary band in the radiowave absorbers and of suppressing the unnecessary reflections by configuring the 90-degree hybrid coupler 13, the BPF 15, the BPF 17 and the radiowave absorbers 19, 21 as indicated in FIG. 1.

In this filter, used as the waveguide-type 90-degree hybrid coupler, the BPFs, etc. are those already approved in terms of a millimeter or submillimeter band; and the filter is easily processed and suitable to high-volume production.

In the following, example applications of the image rejection filter described in Embodiment 1 will be explained.
(Embodiment 2)

In Embodiment 2, a single-sideband receiver will be explained, that comprises the image rejection filter of Embodiment 1.

A traditional system using a Martin-Puplett-type frequency filter has problems such as repeatability and secular changes because this system has a movable part. A 2-backshort system also has a problem about reliability because a sideband ratio changes according to tuning of two mixers. These traditional systems share the same problem such that a sideband ratio is only on the order of 10 to 20 dB to use a phase difference, etc.

A single-sideband receiver of this Embodiment is categorized into a system capable of filtering the image side by using a waveguide-type image rejection filter. The waveguide-type image rejection filter enables the system to be downsized and simplified. The traditional waveguide-type image rejection filters reflect wave within a rejection band instead of letting them pass, and this results in standing waves caused by the reflected waves and interference in the system. During a millimeter or submillimeter remote sensing in particular, the standing waves in the system deteriorate obtained data; therefore, unnecessary frequency components need to be terminated at a radiowave absorber or the like.

Figure 7:
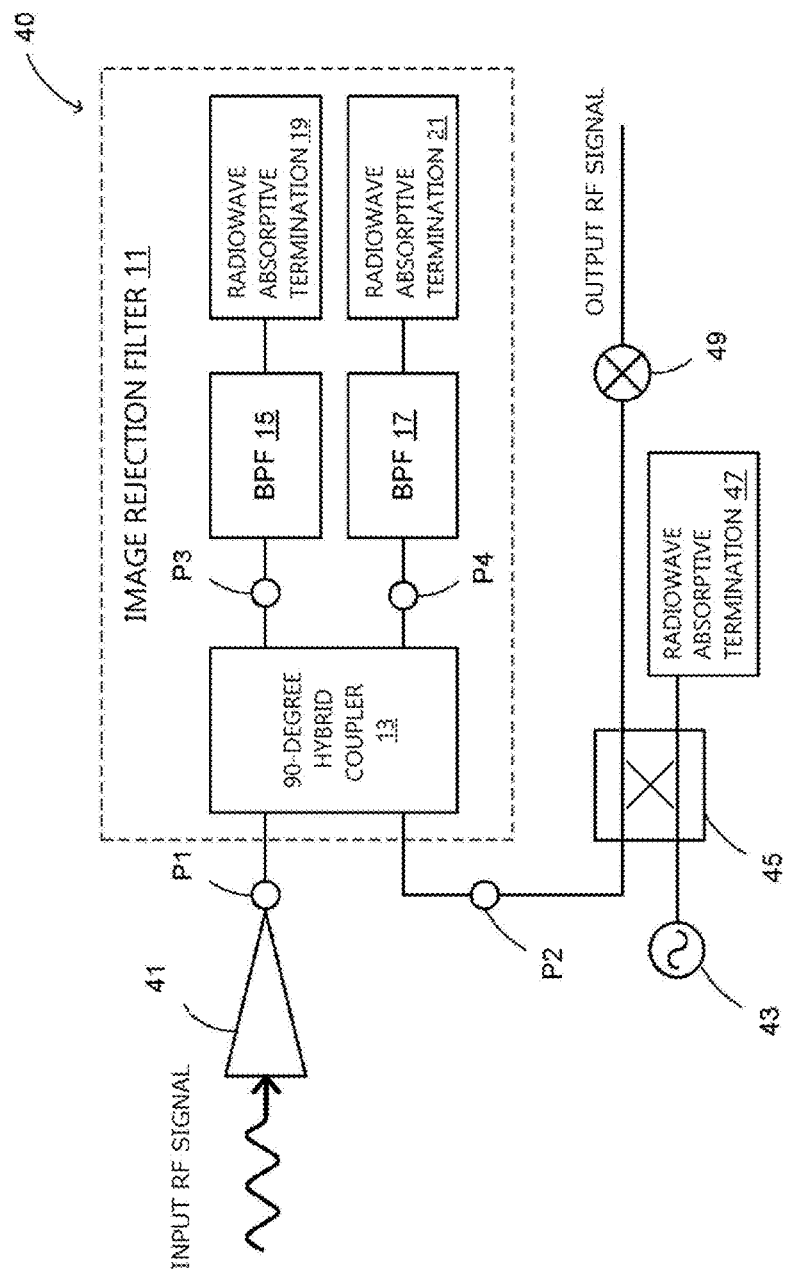
FIG. 7 is a block diagram indicating a structure of a single-sideband receiver of an Embodiment of this invention.

FIG. 7 is a block diagram indicating a structure of a single-sideband receiver of this Embodiment. A single-sideband receiver 40 comprises the following main components:
i) a wave input horn (indicated by a reference numeral 41 in FIG. 7)
ii) an image rejection filter (indicated by a reference numeral 11 in FIG. 7)
iii) a radiowave absorptive termination (indicated as a radiowave absorber 47 in FIG. 7)
iv) a superconductor mixer (indicated by a reference numeral 49 in FIG. 7)

The image rejection filter 11 here is the same as the image rejection filter described in Embodiment 1, and reference numerals used here are the same as the reference numerals used in Embodiment 1.

Similar to Embodiment 1, in the case where a radiowave (signal) outside the pass bands of the BPF 15 and the BPF 17 is injected into the input port P1, any input signal is outputted from the branch port P2. In the case where a radiowave within the pass bands of the BPF 15 and the BPF 17 is injected into the input port P1, the input signal is divided in two in the 90-degree hybrid coupler 13; and the divided signals are absorbed by the radiowave absorbers 19, 21, respectively, after passing through the BPF 15 and the BPF 17, respectively.

The branch port P2 of the 90-degree hybrid coupler 13 is connected to an input port of an LO coupler 45. The LO coupler 45 has two input ports, an output port and a branch port. The output port of the LO coupler 45 is connected to the superconductor mixer 49. The other input port of the LO coupler 45 is connected to a local oscillator 43. The branch port of the LO coupler 45 is connected to the radiowave absorber 47.

An image band signal is terminated at the radiowave absorbers 19, 21 by determining the pass bands of the BPF 15 and the BPF 17 as image bands. This enables single-sideband reception.

Owing to the circuit indicated in FIG. 7, the image bands are terminated at the radiowave absorbers 19, 21 without reflecting the image bands. The waveguide-type 90-degree hybrid coupler 13, the BPF 15, the BPF 17 and the radiowave absorbers 19, 21 are already approved in terms of a millimeter or submillimeter band and are easily processed and suitable to high-volume production.

The BPFs 15, 17 and the radiowave absorbers 19, 21 are capable of keeping reflected power −20 dB or less and are easy to achieve a sideband ratio of 20 dB or more. In addition, the system of this Embodiment uses a passive waveguide circuit only and does not cause any secular changes, with the result that the system may steadily retain the sideband ratio even after long-term use and has a considerable advantage in monitoring applications, etc.

Figure 8:
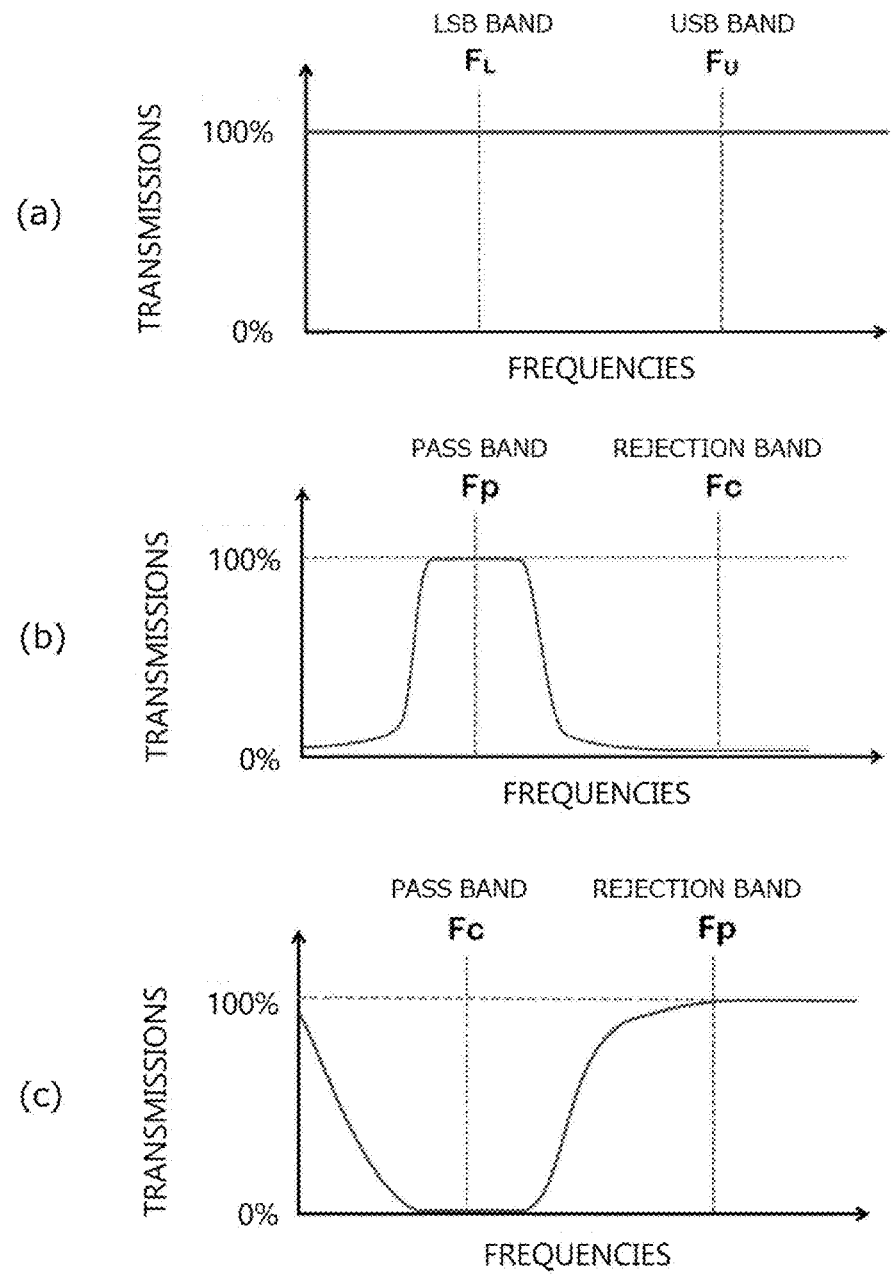
FIG. 8 provides graphs exemplifying frequency characteristics of signals at each section of a single-sideband receiver of FIG. 7.

FIG. 8 provides graphs exemplifying frequency characteristics of the signal at each section of the single-sideband receiver 40 of FIG. 7. FIG. 8 (*a*) exemplifies frequency characteristics of an input RF signal. FIG. 8 (*b*) exemplifies frequency characteristics of the BPF 15 and the BPF 17 (that are involved with the characteristic curve S21 of FIG. 5). FIG. 8 (*c*) exemplifies frequency characteristics of an RF signal of the branch port P2 (that are involved with the characteristic curve S21 of FIG. 6) comparable to the frequency characteristics indicated in FIG. 8 (*b*). The BPF 15 and the BPF 17 have passage characteristics such as an LSB band FL as a center frequency and allow the center frequency to pass through the LSB band but intercept it at a USB band. The image rejection filter 11 has rejection characteristics such as an LSB band FL as a center frequency and allows the center frequency to pass through the USB band but intercepts it at the LSB band. In this Embodiment, the RF signal within the LSB band as the image band is intercepted; and the RF signal within the USB band as the signal band is mixed with an LO signal from the local oscillator 43 by the superconductor mixer 49, becoming an output IF signal.

As described above, this invention substantializes the high-precision and downsized single-sideband receiver with the millimeter or submillimeter band.

Figure 9:
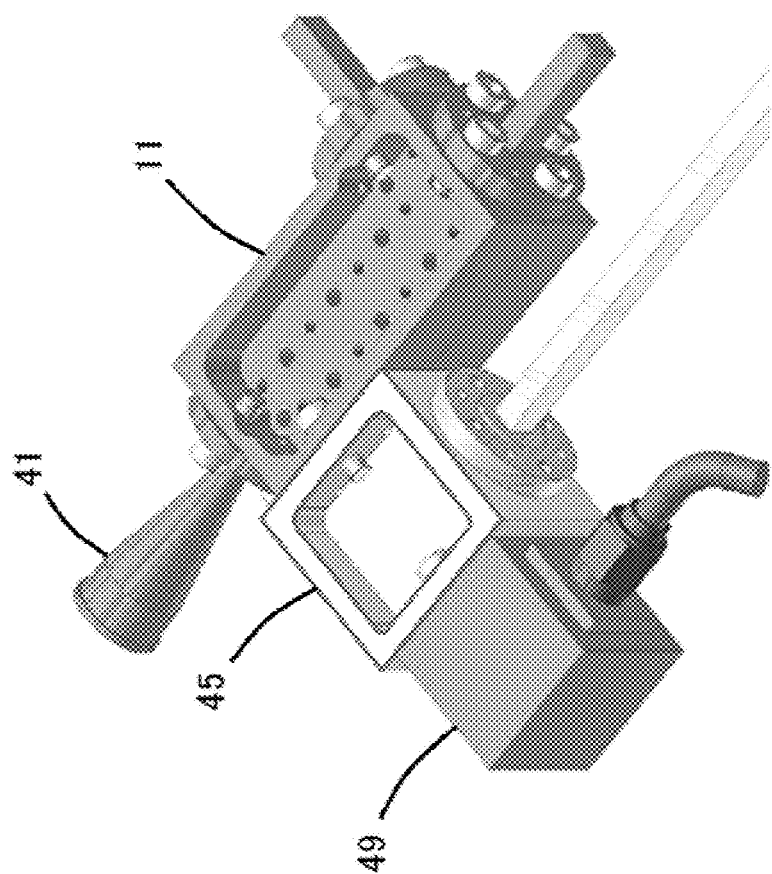
FIG. 9 illustrates a perspective external view of the single-sideband receiver of FIG. 7.

FIG. 9 illustrates a perspective external view of a main part of the single-sideband receiver 40 of FIG. 7. In comparison with FIG. 3, it is evident from FIG. 9 that the wave input horn 41 is connected to the input port P1 of the image rejection filter 11 and that the superconductor mixer 49 is connected to the branch port P2 through the LO coupler 45.

(Embodiment 3)

In Embodiment 3, a frequency divider will be explained, that is converted from the image rejection filter of Embodiment 1 as a modified example.

In recent years, there have been technical advances toward millimeter and submillimeter bands; and waveguides that are low in loss have been increasingly desired as transmission lines. Reason for this is that the millimeter and the submillimeter bands are impractical because these bands lose a significant amount of electric power at a dielectric body in a plane substrate circuit or a dielectric laminated circuit. The waveguides, however, are more difficult as solid circuit components than the plane substrate circuit or the dielectric laminated circuit to prepare the frequency divider.

Figure 10:
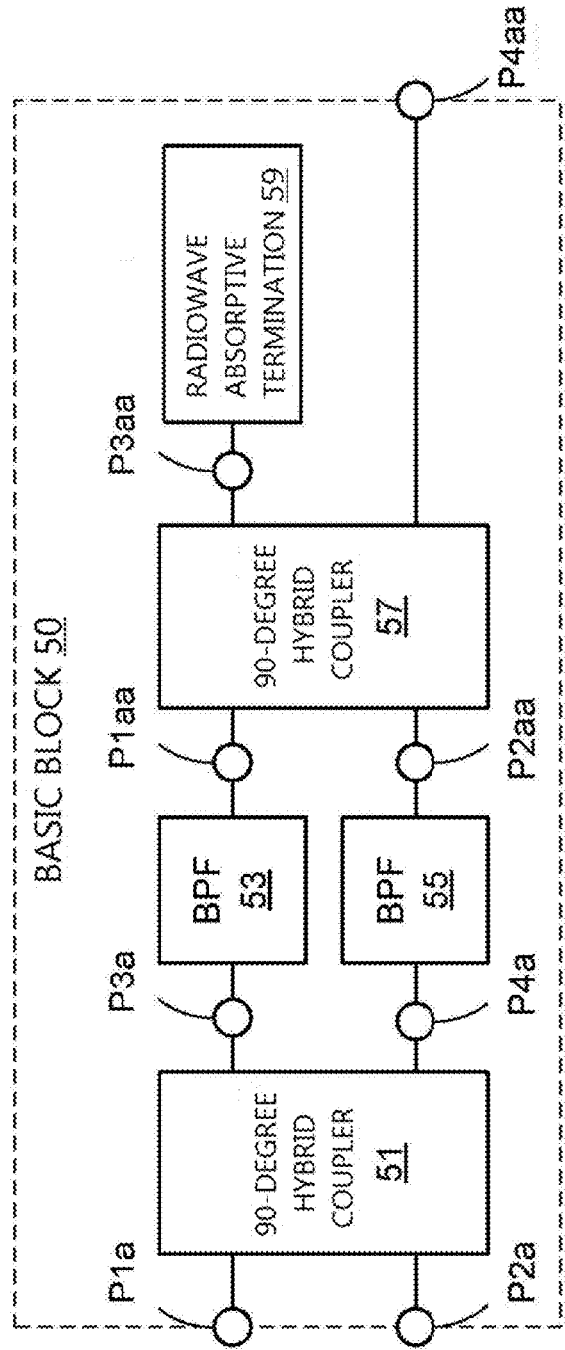
FIG. 10 is a block diagram indicating a basic structure of a waveguide-type frequency divider of an Embodiment of this invention.

FIG. 10 is a block diagram indicating a basic structure of a waveguide-type frequency divider of this Embodiment. A basic block 50 comprises the following components:
i) waveguide-type 90-degree hybrid couplers (indicated by reference numerals 51 and 57, respectively, in FIG. 10)
ii) band pass filters (indicated as BPF 53 and BPF 55, respectively, in FIG. 10)
iii) a radiowave absorptive termination (indicated as a radiowave absorber 59 in FIG. 10)

Structural components here are the same as those described in Embodiment 1.

A 90-degree hybrid coupler 51 has an input port P1*a*, a branch port P2*a*, and output ports P3*a*, P4*a*. Similar to Embodiment 1, each of the output ports P3*a*, P4*a* outputs an RF signal that has half intensity (electric power) of an RF signal inputted into the input port P1*a*. The RF signal outputted from the output port P4*a* deviates by a 90-degree phase from the RF signal outputted from the output port P3*a*. Namely, the input signal inputted into the input port P1*a* is the same in phase as the RF signal outputted from the output port P3*a*; and the RF signal is outputted from the output port P4*a* 90-degree phase later than the input signal. The output port P3*a* is connected with the BPF 53, and the output port P4*a* is connected with the BPF 55.

The BPF 53 and the BPF 55 are connected to a port P1*aa* and a port P2*aa* of the 90-degree hybrid coupler 57, respectively, the coupler 57 being comparable to the 90-degree hybrid coupler 51. The 90-degree hybrid coupler 57 has a port P3*aa* terminated at the radiowave absorber 59.

In the case where an RF signal having a frequency "outside" the pass bands of the BPF 53 and the BPF 55 is inputted into the input port P1*a* of the 90-degree hybrid coupler 51, the input RF signal is divided in two—the one signal deviates by a 90-degree phase from the other signal—and the divided signals are outputted from the output port P3*a* and the output port P4*a*, respectively. The divided signals are then reflected by the BPF 53 and the BPF 55 placed in front of the output port P3*a* and the output port P4*a*, respectively, and return to the 90-degree hybrid coupler 51 through the output port P3*a* and the output port P4*a*, respectively. These reflected waves are then outputted from the input port P1*a* and the branch port P2*a*, and the one reflected wave deviates by a 90-degree phase from the other reflected wave.

The reflected waves returning to the input port P1*a* from the output port P3*a* and the output port P4*a* cancel each other out because these waves have a 180-degree phase difference, with the result that these waves are not outputted from the input port P1*a*. Namely, the signal returning from the output port P3*a* to the input port P1*a* is the same in phase as the input signal. In the meanwhile, the signal from the output port P4*a* returns to the input port P1*a* 90-degree phase later than the input signal; however, the signal returns to the input port P1*a* 180-degree phase later than the input signal because the 90-degree hybrid coupler 51 makes the signal additionally late at 90 degrees.

The reflected waves from the output port P3*a* and the output port P4*a* return to the branch port P2*a* 90 degrees later than the input signal and become the same in phase as the input signal, and the RF signal becomes the same in intensity as the input RF signal inputted into the input port P1*a* when loss may be disregarded.

Namely, in the case where the RF signal outside the pass bands of the BPF 53 and the BPF 55 is inputted into the input port P1*a*, the input RF signal is outputted from the branch port P2*a*.

In the case where an RF signal within the pass bands of the BPF 53 and the BPF 55 is inputted into the input port P1*a*, the input RF signal is divided in two; and the divided signals are outputted from the output port P3*a* and the output port P4*a*, respectively, to pass through the BPF 53 and the BPF 55, respectively. The RF signals, which have passed through the BPF 53 and the BPF 55, respectively, are inputted into the input port P1*aa* and the branch port P2*aa* of the 90-degree hybrid coupler 57, respectively, and are then outputted to the output port P3*aa* and the output port P4*aa*, respectively—the one RF signal deviates by a 90-degree phase from the other RF signal. Namely, the signal inputted into the input port P1*aa* is the same in phase as the input signal inputted into the input port P1*a*. The single is inputted into the branch port P2*aa* 90-degree phase later than the signal inputted into the input port P1*a*.

The output port P3*aa* receives the two signals: the signal that is the same in phase as the signal inputted into the input port P1*aa*; and the signal that is 90 degrees later than the signal inputted into the branch port P2*aa*. In other words, the signal that is the same in phase as the input signal is guided from the input port P1*aa*; and the signal that is 180 degrees later than the input signal is guided from the branch port P2*aa*. As a result, the two signals cancel each other out; and the output port P3*aa* does not output any signal.

The output port P4*aa* receives the two signals: the signal whose phase is 90 degrees later than the signal inputted into the input port P1*aa*; and the signal that is the same in phase as the signal inputted into the branch port P2*aa*. In other words, the signal whose phase is 90 degrees later than the input signal is guided from the input port P1*aa*; and the signal whose phase is 90 degrees later than the input signal is guided from the branch port P2*aa*. As a result, the two signals that are the same in phase are coupled; and the coupled signal is outputted from the output port P4*aa*.

In the case where an RF signal within the pass bands of the BPF 53 and the BPF 55 is inputted into the input port P1*a*, the input RF signal is outputted from the output port P4*aa*.

In sum, the signal within the pass bands of the BPF 53 and the BPF 55 is outputted from the output port P4*aa*; and the RF signal outside the pass bands is outputted from the branch port P2*a*.

Figure 11:
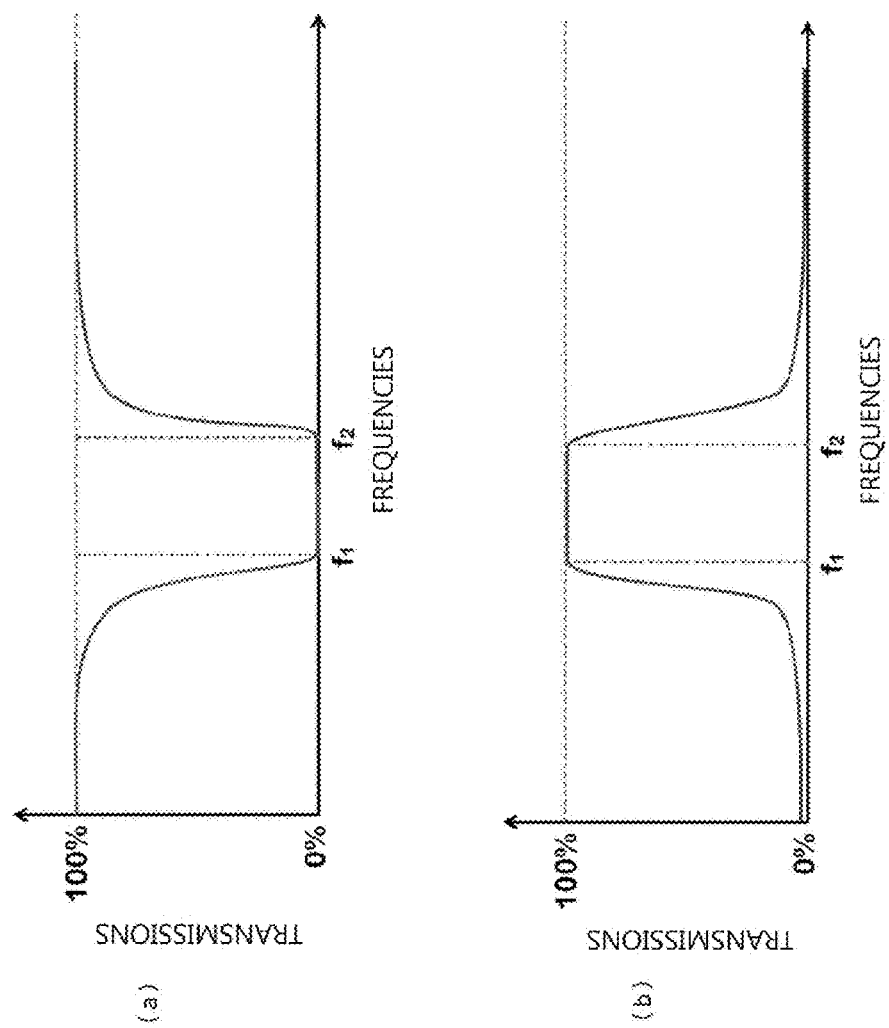
FIG. 11 provides graphs exemplifying frequency characteristics of a basic block of FIG. 10.

FIG. 11 provides graphs exemplifying frequency characteristics of the basic block 50 of FIG. 10. The BPF 53 and the BPF 55 allow frequencies within a band from $f_1$ to $f_2$ to pass through. FIG. 11 (*a*) exemplifies frequency characteristics of the filter using the input port P1*a* for receiving a signal and the branch port P2*a* for outputting the signal and indicates band rejection characteristics that reject the frequencies within the band from $f_1$ to $f_2$. FIG. 11 (*b*) exemplifies frequency characteristics of the filter using the input port P1*a* for receiving a signal and the output port P4*aa* for outputting the signal and indicates band rejection characteristics that reject the frequencies within the band from $f_1$ to $f_2$.

Figure 12:
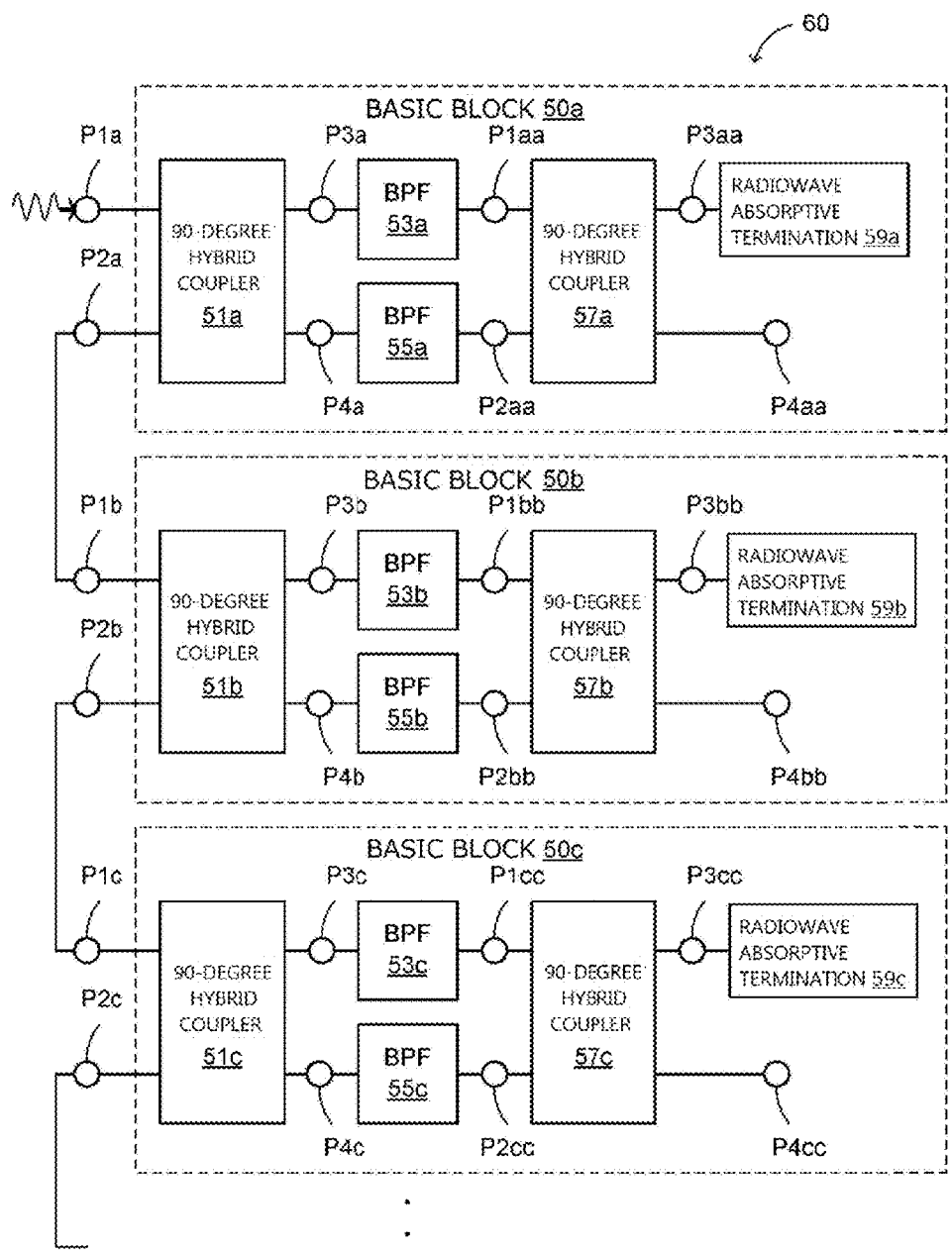
FIG. 12 is a block diagram indicating structures of waveguide-type frequency dividers of an Embodiment of this invention.

Based on this aspect, a waveguide-type frequency divider indicated in FIG. 12 may be substantialized, that comprises a basic block 50*a*, a basic block 50*b* and a basic block 50*c* in a cascade arrangement where center frequencies passing through pass bands of BPFs deviate from one another.

Figure 13:
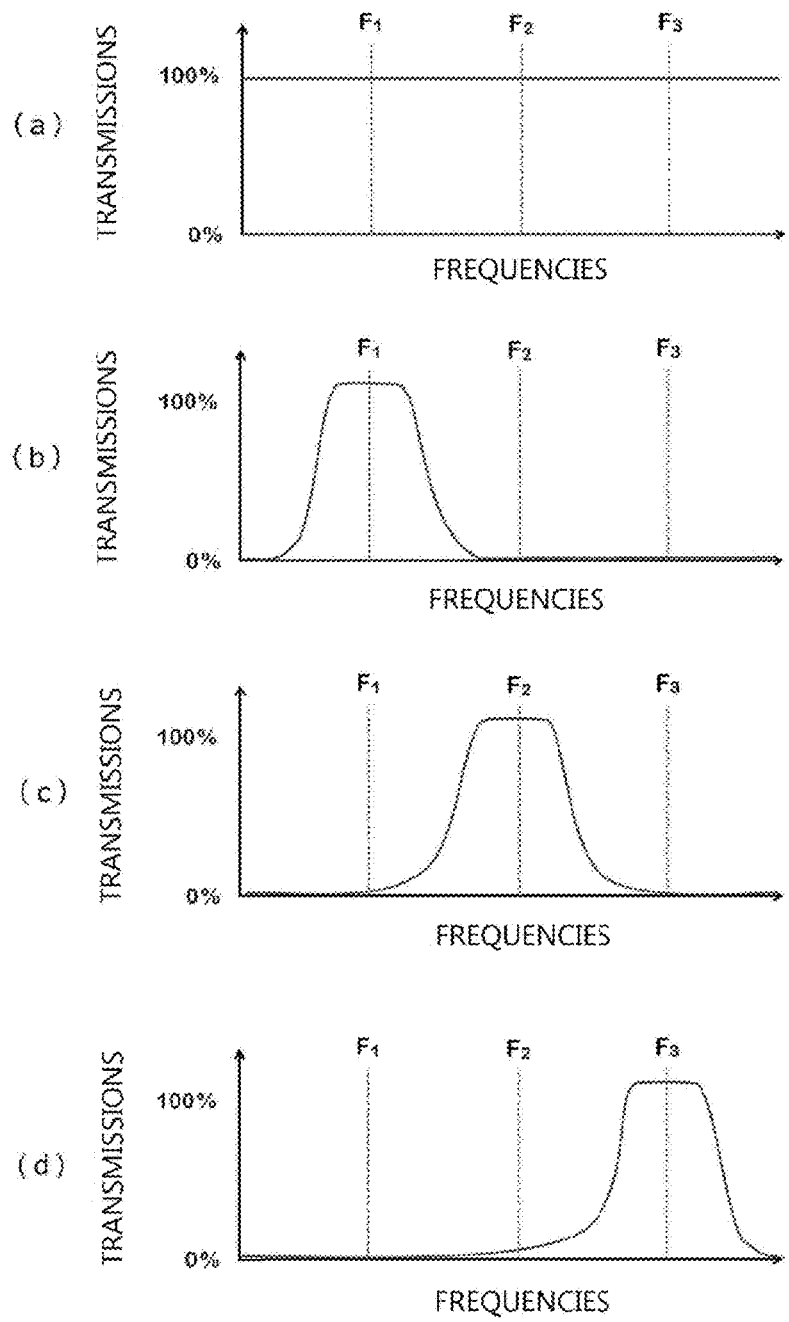
FIG. 13 provides graphs exemplifying frequency characteristics of sections of the frequency dividers of FIG. 12.

FIG. 13 provides graphs exemplifying frequency characteristics of sections of a frequency divider 60 indicated in FIG. 12. FIG. 13 (*a*) exemplifies frequency characteristics of an input RF signal. FIG. 13 (*b*) exemplifies frequency characteristics of an output RF signal outputted from the output port P4*aa*. $F_1$ indicates the center frequency of BPF 53*a* and BPF 55*a*. FIG. 13 (*c*) exemplifies frequency characteristics of an output RF signal outputted from an output port P4*bb*. $F_2$ indicates the center frequency of BPF 53*b* and BPF 55*b*.

FIG. 13 (*d*) exemplifies frequency characteristics of an output RF signal outputted from an output port P4*cc*. $F_3$ indicates the center frequency of BPF 53*c* and BPF 55*c*.

The traditional frequency divider divides signal intensity—for example, three dividers divide intensity in three; however, the frequency divider of this Embodiment substantially has no such loss.

In this Embodiment, used as the waveguide-type 90-degree hybrid coupler, the BPFs, etc. constituting the frequency divider may be those already approved in terms of a millimeter or submillimeter band; and the frequency divider is easily processed and suitable to high-volume production.

(Embodiment 4)

This Embodiment will explain a structure of the waveguide-type frequency divider of Embodiment 3, that uses a superconductor mixer as a sideband-separating mixer. This waveguide-type frequency divider may substantiate a system having the following advantages with a millimeter or submillimeter band: The system may become downsized yet high-precision and low in loss in addition to reliable without having secular changes.

In this invention, used as a basic block of the frequency divider is the basic block of Embodiment 3 indicated in FIG. 10. In the basic block of FIG. 10, in the case where the signal inputted into the input port P1*a* is within the pass bands of the BPF 53 and the BPF 55, the signal is outputted from the output port P4*aa*; however, the signal outside the pass bands is outputted from the branch port P2*a* (see FIG. 11).

Figure 14:
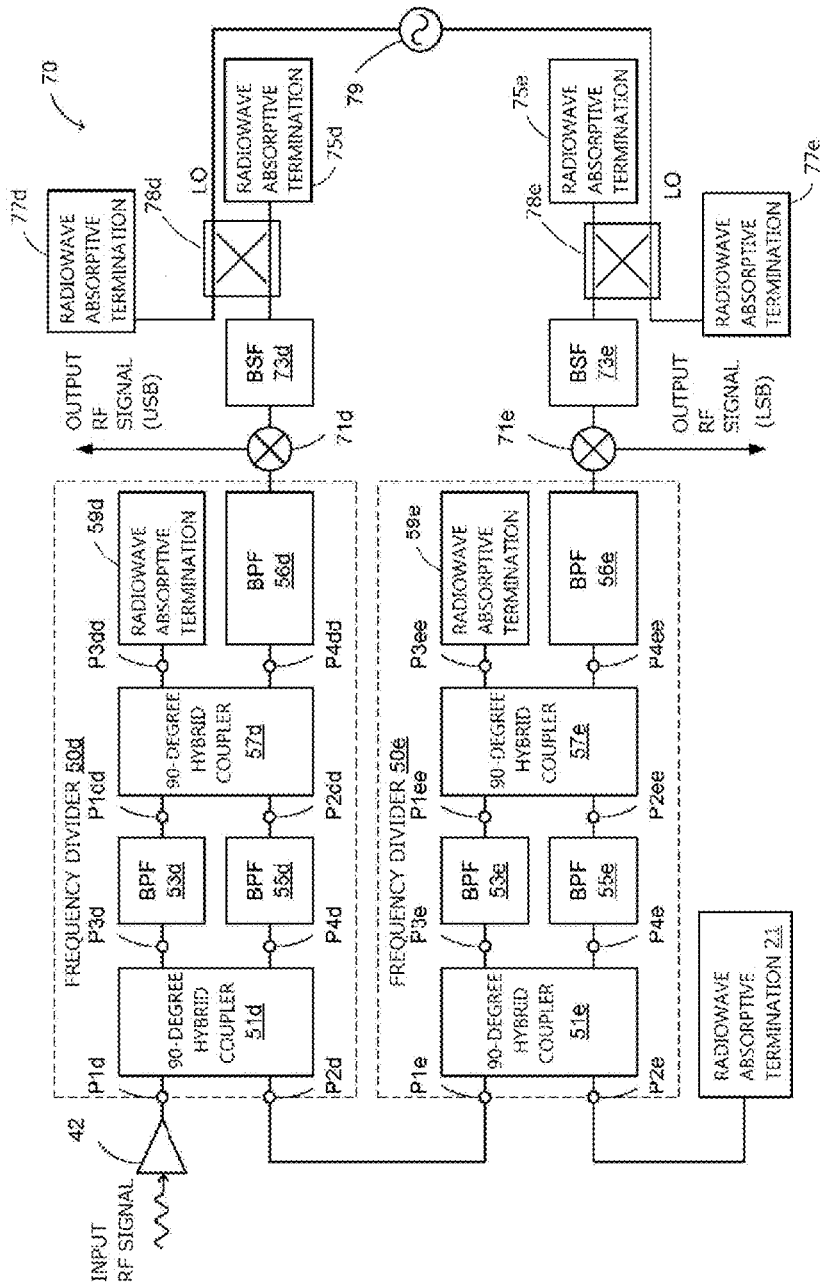
FIG. 14 is a block diagram indicating a structure of a sideband-separating receiver of an Embodiment of this invention.

FIG. 14 is a block diagram indicating a structure of a sideband-separating superconductive receiver of this Embodiment. A sideband-separating receiver 70 comprises the following components:
i) a wave input horn (indicated by a reference numeral 42 in FIG. 14)
ii) waveguide-type 90-degree hybrid couplers (indicated by reference numerals 51*d*, 51*e*, 57*d* and 57*e*, respectively, in FIG. 14)
iii) waveguide-type band pass filters (indicated as BPF 53*d*, BPF 53*e*, BPF 55*d*, BPF 55*e*, BPF 56*d* and BPF 56*e*, respectively, in FIG. 14)
iv) radiowave absorbers (indicated by reference numerals 59*d*, 59*e*, 75*d*, 75*e*, 77*d* and 77*e*, respectively, in FIG. 14)
v) superconductor SIS mixers (indicated by reference numerals 71*d* and 71*e*, respectively, in FIG. 14)
vi) waveguide-type band rejection filters (indicated as BSF 73*d* and BSF 73*e*, respectively, in FIG. 14)
vii) LO couplers 78*d*, 78*e*

The BPF 53*d* and the BPF 53*d* of the frequency divider 50*d* are configured to have a center frequency coincident with a center frequency of a USB signal, and the BPF 53*e* and the BPF 55e of the frequency divider 50e are configured to have a center frequency coincident with a center frequency of an LSB signal. The signal within a frequency band of USB is selectively transmitted to the superconductor mixer 71d, and the signal of a frequency band of LSB is selectively transmitted to the superconductor mixer 71e. To send a signal to the superconductor mixer, a mechanism called a backshort is necessary where the signal is reflected inside a transmission line. In this Embodiment, the BSF 73d and the BSF 73e are placed behind the superconductor mixer 71d and the superconductor mixer 71e, respectively, each of the BSFs functioning as a backward coupler and being configured to have a rejection band so as to reflect the signals.

It is necessary to input local oscillator signals (LO signals) to the superconductor mixers 71d, 71e, respectively. The LO signals are outputted from a local oscillator 79 indicated in FIG. 14. The LO signals from the local oscillator 79 are inputted into the LO couplers 78d, 78e, respectively, and then into the superconductor mixers 71d, 71e, respectively, from the side opposite to the side where the RF signals are inputted.

The frequencies of the LO signals deviate by a band of an intermediate-frequency signal IF from the receiving signals. The LO signals, therefore, go toward the superconductor mixers 71d, 71e, respectively, without being intercepted by the BSF 73d and the BSF 73e. To send the LO signals to the superconductor mixer 71d and the superconductor mixer 71e, the backshort is still necessary; and the BPF 56d and the BPF 56e have pass bands different from frequencies of the LO signals. The LO signals are, therefore, reflected by the BPF 56d and the BPF 56e. Consequently, the BPF 56d and the BPF 56e may be considered the backshort with respect to the LO signals.

Figure 15:
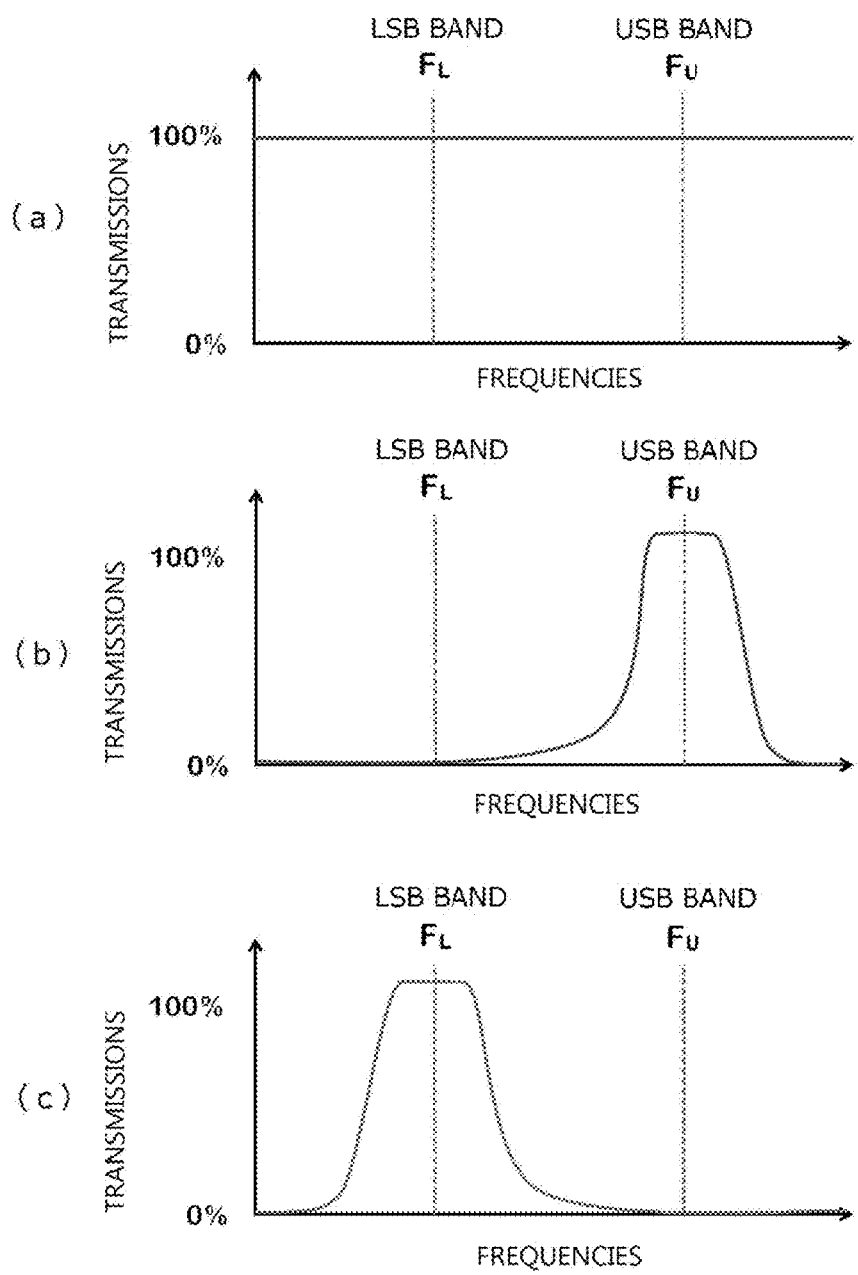
FIG. 15 provides graphs exemplifying frequency characteristics of sections of the sideband-separating receiver of FIG. 14.
Figure 16:
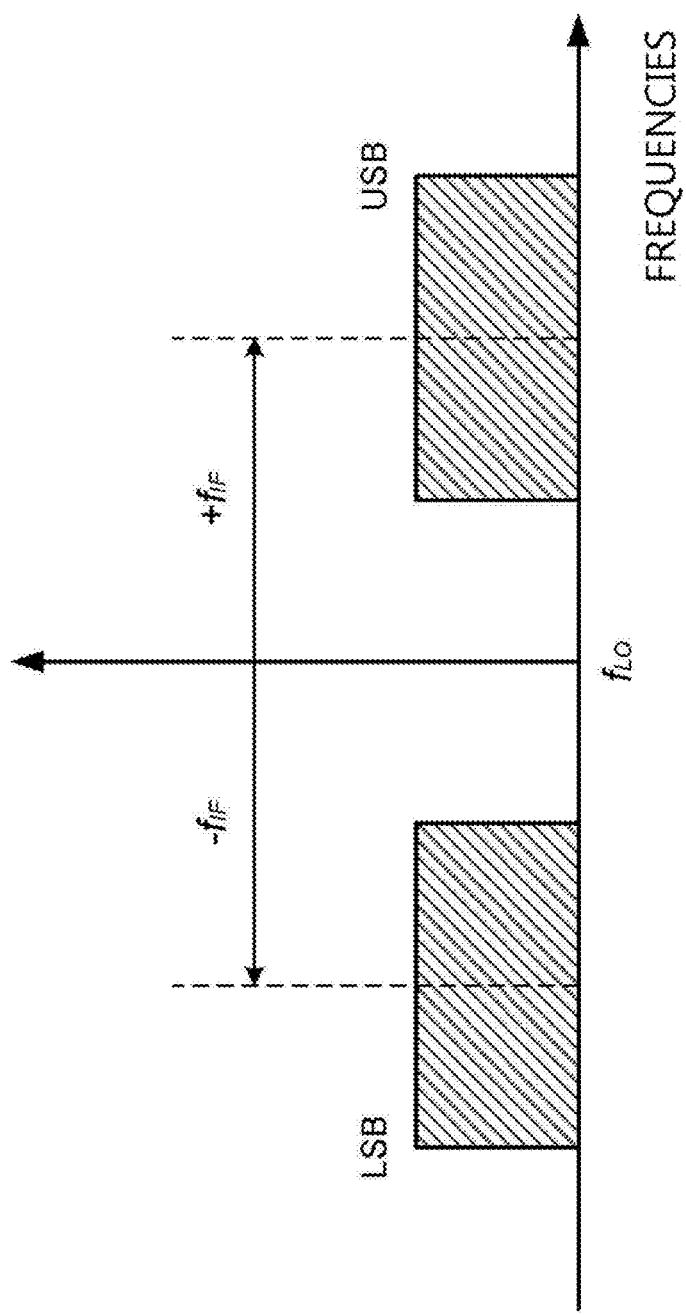
FIG. 16 is a graph indicating how an IF signal correlates with an LO signal on a frequency axis, both the signals being outputted from a publicly known heterodyne receiver.

FIG. 15 provides graphs exemplifying frequency characteristics of sections of the sideband-separating receiver 70 indicated in FIG. 14. FIG. 15 (a) exemplifies frequency characteristics of an input RF signal outputted from the input port P1d. FIG. 13 (b) exemplifies frequency characteristics of an output RF signal outputted from the BPF 56d that is to become an input signal inputted into the superconductor mixer 71d. Fu indicates a center frequency of the BPF 53d and the BPF 55d. FIG. 13 (c) exemplifies frequency characteristics of an output RF signal outputted from the BPF 56e that is to become an input signal inputted into the superconductor mixer 71e. $F_L$ indicates a center frequency of the BPF 53e and the BPF 55e.

Owing to this structure, the superconductor mixer 71d carries out heterodyne reception for receiving only the USB signal; and the superconductor mixer 71e carries out heterodyne reception for receiving only the LSB signal. Consequently, the both sidebands may be separated.

The circuit of FIG. 14 may substantiate the sideband-separating receiver without balancing two superconductor mixers as was practiced traditionally.

Used as the waveguide-type 90-degree hybrid coupler, the BPFs, etc. constituting the frequency divider of this Embodiment are those already approved in terms of a millimeter or submillimeter band; and the frequency divider is easily processed and suitable to high-volume production.

The waveguide-type image rejection filters are highly capable of keeping reflected power −20 dB or less and are easy to achieve a sideband ratio of 20 dB or more.

Millimeterwave and sub-millimeterwave ranges are significant in radio astronomy. In recent years, various receivers have been strenuously developed to observe atmospheric molecules such as ozone. Although receivers using a superconductor mixer(s) with the millimeterwave and sub-millimeterwave ranges are widely used as having highest sensitivity, the receivers have not been developed in order to comprise separate single-sidebands. This invention, however, is highly ingenious compared to the traditional receivers; and its capabilities are far better than the traditional receivers.

This invention may have a variety of modified examples besides the above-described Embodiments. Such modified examples should be comprehended to fall within the range of this invention. This invention should include the scope of claims and all varied examples comparable to those in claims and within the claims.

EXPLANATION OF REFERENCE NUMERALS 11, 100: image rejection filter
13, 13a, 13b: 90-degree hybrid coupler
15, 17: BPF
19, 21: radiowave absorber
23: bend section
31, 33: waveguide block
40: single-sideband receiver
41, 42: wave input horn
43: local oscillator
45, 78d, 78e: LO coupler
47: radiowave absorber
49: superconductor mixer
50, 50a, 50b, 50c, 50d, 50e: basic block
51, 51a, 51b, 51c, 51d, 51e, 57, 57a, 57b, 57c, 57d, 57e: 90-degree hybrid coupler
53, 53a, 53b, 53c, 53d, 53e, 55, 55a, 55b, 55c, 55d, 55e, 56d, 56e: BPF
59, 59a, 59b, 59c, 59d, 59e, 75d, 75e, 77d, 77e: radiowave absorber
60: frequency divider
70: sideband-separating receiver
71d, 71e: superconductor mixer
73d, 73e: BSF
79: local oscillator
101: main track
103: resonator
105: iris
P1, P1a, P1aa, P1b, P1bb, P1c, P1cc, P1d, P1dd, P1e, P1ee: input port
P2, P2a, P2aa, P2b, P2bb, P2c, P2cc, P2d, P2dd, P2e, P2ee: branch port
P3, P3a, P3aa, P3b, P3bb, P3c, P3cc, P3d, P3dd, P3e, P3ee, P4, P4a, P4aa,
P4b, P4bb, P4c, P4cc, P4d, P4dd, P4e, P4ee: output port

The invention claimed is:

1. An waveguide-type image rejection filter comprising:
a waveguide-type 90-degree hybrid coupler having an input port for receiving an input signal within a millimeter or submillimeter band, first and second output ports for outputting divided signals, respectively, and a branch port for outputting a coupled signal composed of two signals inputted from the first and second output ports;
a pair of band pass filters: a waveguide-type first band pass filter whose one end is connected with the first output port and a waveguide-type second band pass filter whose one end is connected with the second output port; and
a pair of radiowave absorptive terminations: a first radiowave absorptive termination connected to the other end of the first band pass filter and a second radiowave absorptive termination connected to the other end of the second band pass filter, wherein the 90-degree hybrid coupler comprises a first waveguide; a second waveguide; and a coupling section for coupling the first waveguide to the second waveguide, wherein the first waveguide has the input port at its end and the first band pass filter at the other end, and the second waveguide has the branch port at its end and the second band pass filter at the other end, wherein a shortest waveguide length between the coupling section and the first band pass filter along the first waveguide is the same as a shortest waveguide length between the coupling section and the second band pass filter along the second waveguide, and wherein the waveguide length meets the following formula:

$$\frac{\lambda_g}{4} < d < 5 \cdot \lambda_g \quad \text{[Formula 1]}$$

wherein d indicates a waveguide length, and $\lambda_g$ indicates a wavelength of an image band that should be intercepted in the waveguide.

2. The image rejection filter according to claim 1, wherein the 90-degree hybrid coupler and a pair of the band pass filters are configured as an integrated waveguide unit; and a pair of the radiowave absorptive terminations is connected to the waveguide units, respectively.

3. The image rejection filter according to claim 1, wherein the waveguide length meets the following formula:

$$\frac{\lambda_g}{2} < d < \lambda_g \quad \text{[Formula 2]}$$

wherein d indicates a waveguide length, and $\lambda_g$ indicates a wavelength of an image band that should be intercepted in the waveguide.

4. The image rejection filter according to claim 1, wherein the first waveguide from the coupling section to the first band pass filter is configured to be a straight line; and the second waveguide from the coupling section to the second band pass filter is configured to be a straight line.

5. A single-sideband receiver comprising:
the image rejection filter according to claim 1;
a local oscillator for outputting a local oscillator signal for heterodyne reception;
a coupler having two input ports and an output port, wherein the one input port is connected to the image rejection filter and the other input port is connected to the local oscillator, wherein the coupler couples the input signal having passed through the image rejection filter with the local oscillator signal and outputs the signals from the output port; and
a mixer connected to the output port, wherein the mixer mixes the input signal having passed through the image rejection filter with the local oscillator signal and outputs an intermediate-frequency signal,
wherein the image rejection filter is configured to have a heterodyne receiving scheme to intercept either one of a USB band and an LSB band involved in the heterodyne reception.

6. A waveguide-type frequency divider comprising:
a waveguide-type front hybrid coupler having a front input port for receiving an input signal within a millimeter or submillimeter band, front first and front second output ports for outputting divided input signals, respectively, wherein the one signal deviates by a 90-degree phase from the other signal, and a front branch port for outputting a coupled signal composed of two signals inputted from the front first and front second output ports;
a pair of band pass filters: a waveguide-type first band pass filter whose one end is connected with the front first output port and a waveguide-type second band pass filter whose one end is connected with the front second output port;
a waveguide-type rear hybrid coupler having a rear input port, rear first and rear second output ports, and a rear branch port, wherein the rear input port is connected to the other end of the first band pass filter, and the rear branch port is connected to the other end of the second band pass filter; and
a radiowave absorptive termination connected to the rear first output port,
wherein the front hybrid coupler comprises a first waveguide; a second waveguide; and a coupling section for coupling the first waveguide to the second waveguide,
wherein the first waveguide has the front input port at its end and the first band pass filter at the other end, and the second waveguide has the front branch port at its end and the second band pass filter at the other end,
wherein a shortest waveguide length between the coupling section and the first band pass filter along the first waveguide is the same as a shortest waveguide length between the coupling section and the second band pass filter along the second waveguide, and
wherein the waveguide length meets the following formula:

$$\frac{\lambda_g}{4} < d < 5 \cdot \lambda_g \quad \text{[Formula 3]}$$

wherein d indicates a waveguide length, and $\lambda_g$ indicates a wavelength of an image band that should be intercepted in the waveguide.

7. The frequency divider according to claim 6, wherein the front and the rear hybrid couplers and a pair of the band pass filters are configured as an integrated waveguide unit.

8. The frequency divider according to claim 6, wherein the waveguide length meets the following formula:

$$\frac{\lambda_g}{2} < d < \lambda_g \quad \text{[Formula 4]}$$

wherein d indicates a waveguide length, and $\lambda_g$ indicates a wavelength of an image band that should be intercepted in the waveguide.

9. The frequency divider according to claim 6, wherein the first waveguide from the coupling section to the first band pass filter is configured to be a straight line; and the second waveguide from the coupling section to the second band pass filter is configured to be a straight line.

10. A multi-output frequency divider comprising a plurality of the frequency dividers according to claim 6 that are lined up and connected in series, wherein a front branch port of the front frequency divider is connected to a front input port of the rear frequency divider; and wherein the band pass filter pair of the one frequency divider is different in pass band from the band pass filter pair of the other frequency divider.

11. A sideband-separating receiver using the two frequency dividers according to claim 6 to be used for USB and LSB, respectively,
wherein the sideband-separating receiver comprises:
the two frequency dividers, wherein a front branch port of the front frequency divider is connected to a front input port of the rear frequency divider; the front frequency divider allows USB to pass through a pair of band pass filters; and the rear frequency divider allows LSB to pass through a pair of band pass filters;
a local oscillator for outputting a local oscillator signal for heterodyne reception;
a USB mixer whose one input is connected to a rear second output port of the USB frequency divider;
a USB image rejection filter whose one end is connected to the other input of the USB mixer and configured for a backshort to intercept a USB band;
a USB coupler placed on the other side of the USB image rejection filter to send the local oscillator signal to the USB mixer;
an LSB mixer whose one input is connected to a rear second output port of the LSB frequency divider;
an LSB image rejection filter whose one end is connected to the other input of the LSB mixer and configured for a backshort to intercept an LSB band; and
an LSB coupler placed on the other side of the LSB image rejection filter to send the local oscillator signal to the LSB mixer.

* * * * *